(12) United States Patent
Naruse

(10) Patent No.: US 10,937,422 B2
(45) Date of Patent: Mar. 2, 2021

(54) VOICE CONTROL SYSTEM, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Taketomo Naruse, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 93 days.

(21) Appl. No.: 16/181,575

(22) Filed: Nov. 6, 2018

(65) Prior Publication Data

US 2019/0156823 A1 May 23, 2019

(30) Foreign Application Priority Data

Nov. 20, 2017 (JP) .............................. JP2017-223056

(51) Int. Cl.
*G10L 15/22* (2006.01)
*G10L 15/30* (2013.01)
*G06F 3/16* (2006.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
USPC .............. 704/1–504; 358/1.15, 1.1; 709/247; 346/107.3
See application file for complete search history.

(56) References Cited

U.S. PATENT DOCUMENTS

| 6,477,570 | B1* | 11/2002 | Takayama | ............. | G06F 3/1293 |
| | | | | | 709/224 |
| 6,987,580 | B2* | 1/2006 | Watanabe | ........... | H04M 3/5322 |
| | | | | | 358/1.15 |
| 2001/0034774 | A1* | 10/2001 | Watanabe | .......... | H04N 1/00973 |
| | | | | | 709/217 |
| 2006/0227946 | A1* | 10/2006 | Henderson | ........... | H04M 11/007 |
| | | | | | 379/100.01 |
| 2015/0279373 | A1* | 10/2015 | Hanazawa | ............ | G10L 15/222 |
| | | | | | 704/275 |
| 2015/0331665 | A1* | 11/2015 | Ishii | .................. | H04N 21/4826 |
| | | | | | 715/728 |
| 2019/0156823 | A1* | 5/2019 | Naruse | .................... | G10L 15/30 |

FOREIGN PATENT DOCUMENTS

JP 2017-010381 A 1/2017

* cited by examiner

*Primary Examiner* — Marcus T Riley
(74) *Attorney, Agent, or Firm* — Venable LLP

(57) ABSTRACT

When a voice instruction received by a voice control device is an instruction to cause an output apparatus to execute output, a candidate of the output apparatus is notified. The voice control device receives, by voice, a designation of the output apparatus from the candidate of the output apparatus. The output apparatus corresponding to the received designation executes the output based on the voice instruction.

17 Claims, 20 Drawing Sheets

FIG. 18

| MAKER | SERVER COOPERATION | SETTING METHOD | COOPERATING SERVER |
|---|---|---|---|
| COMPANY A | ○ | SCREEN DISPLAY | SERVER A |
| COMPANY B | ○ | INVITATION PAGE | SERVER B |
| COMPANY C | ○ | PORTABLE TERMINAL | SERVER C |
| COMPANY D | × | × | × |
| COMPANY E | ○ | SCREEN DISPLAY | SERVER E |

VOICE CONTROL SYSTEM, CONTROL METHOD, AND NON-TRANSITORY COMPUTER-READABLE STORAGE MEDIUM STORING PROGRAM

BACKGROUND OF THE INVENTION

Field of the Invention

The present invention relates to a voice control system including a voice control device, a control method, and a non-transitory computer-readable storage medium storing a program.

Description of the Related Art

Japanese Patent Laid-Open No. 2017-10381 discloses a technique of selecting a printing apparatus to execute image formation from a plurality of printing apparatuses.

In Japanese Patent Laid-Open No. 2017-10381, however, a user needs to perform a selection operation on a print screen to select a desired printing apparatus from a plurality of predetermined printing apparatuses. In recent years, an output apparatus such as a printing apparatus is used in various scenarios, and there is a demand for a technique of further improving operability in selecting an output apparatus to execute output.

SUMMARY OF THE INVENTION

An aspect of the present invention is to eliminate the above-mentioned problems with the conventional technology. The present invention provides a voice control system that improves operability in selecting an output apparatus, a control method, and a non-transitory computer-readable storage medium storing a program.

The present invention in one aspect provides a voice control system that includes a voice control device configured to receive a voice instruction and can control an output apparatus by the voice instruction, comprising: a first notification unit configured to notify a candidate of the output apparatus when the voice instruction received by the voice control device is an instruction to cause the output apparatus to execute output; a first reception unit configured to receive, by the voice control device, a designation of the output apparatus from the candidate of the output apparatus by voice after the candidate is notified by the first notification unit; and a control unit configured to cause the output apparatus corresponding to the designation received by the first reception unit to execute the output based on the voice instruction.

According to the present invention, it is possible to improve operability in selecting an output apparatus.

Further features of the present invention will become apparent from the following description of exemplary embodiments with reference to the attached drawings.

BRIEF DESCRIPTION OF THE DRAWINGS

FIG. 18 is a view showing a table held by the communication apparatus.

DESCRIPTION OF THE EMBODIMENTS

Figure 1:
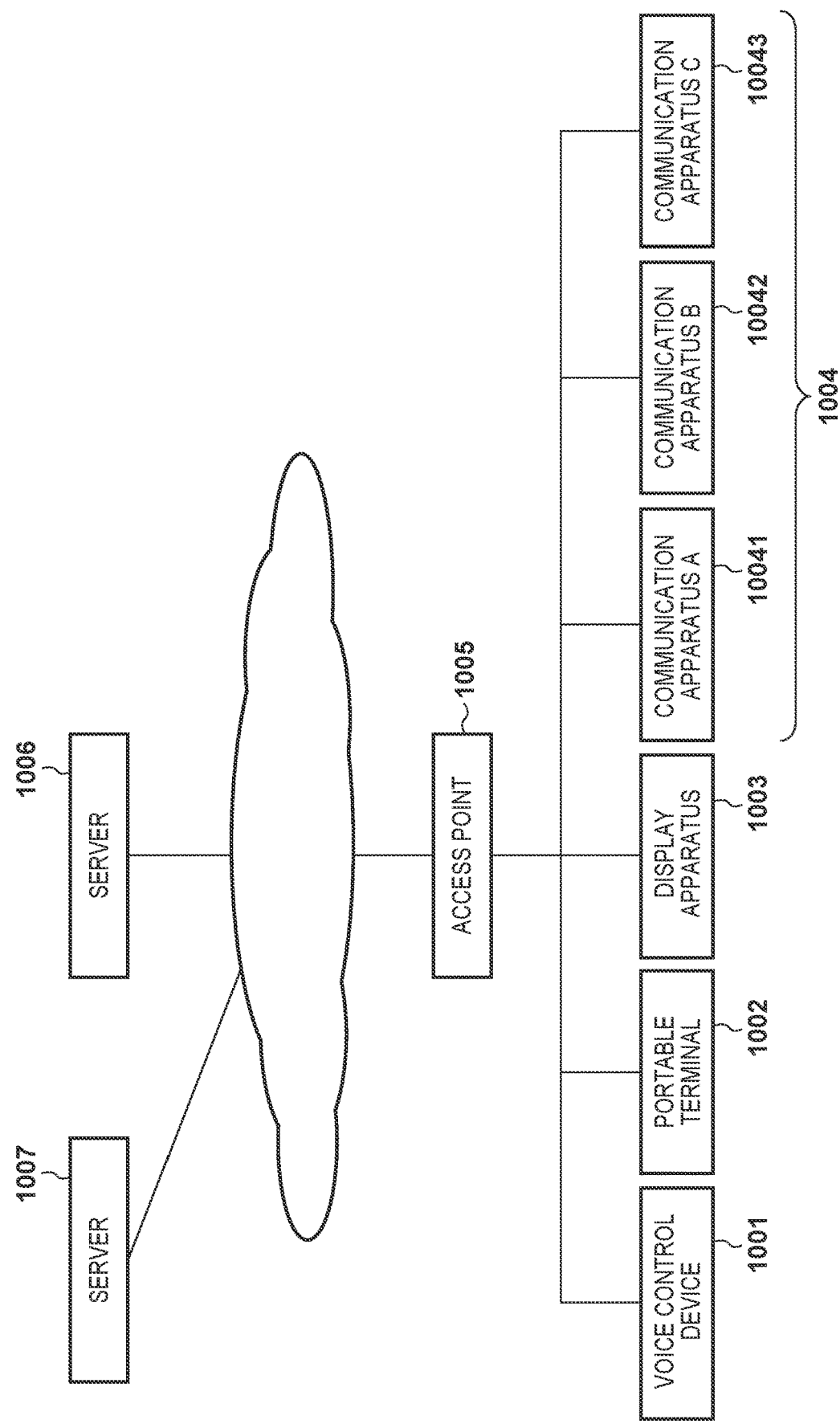
FIG. 1 is a block diagram showing a system configuration.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

FIG. 1 shows an example of the configuration of a voice control system according to this embodiment. The system according to this embodiment includes, for example, a voice control device 1001, a portable terminal 1002, a display apparatus 1003, a communication apparatus A 10041, a communication apparatus B 10042, a communication apparatus C 10043, an access point (AP) 1005, and a server 1006. This system is a system capable of controlling a communication apparatus and the like by a voice received by the voice control device. The voice control device 1001 is, for example, a smart speaker. The portable terminal 1002 is, for example, an arbitrary portable terminal such as a smartphone, a notebook PC (Personal Computer), a tablet terminal, or a PDA (Personal Digital Assistant). Note that a description will be made below assuming that the portable terminal 1002 is a smartphone. Note that in this embodiment, a desktop PC may be used as the portable terminal 1002. Hence, the portable terminal is sometimes called a terminal apparatus. The display apparatus 1003 is, for example, a digital TV. A communication apparatus 1004 is, for example, a printer but may be a copying machine, a facsimile apparatus, a digital camera, or the like. In addition, the communication apparatus 1004 may be a multi-function peripheral having a plurality of functions such as a copy function, a FAX function, and a printing function. That is, the communication apparatus 1004 is an output apparatus that performs printing, display, and the like, and the output form is not limited to printing. Note that the communication apparatus A 10041, the communication apparatus B 10042, and the communication apparatus C 10043 will be expressed as the communication apparatus 1004 below when generalized. If the communication apparatus 1004 is a printing apparatus, it is a printer such as an inkjet printer, a full-color laser beam printer, or a monochrome printer.

The voice control device 1001 to the communication apparatus 1004 can be connected to (communicate with) the server 1006 via the AP 1005 and the Internet. In addition, the voice control device 1001 to the communication apparatus 1004 can be connected to (communicate with) each other via the AP 1005. FIG. 1 shows one voice control device 1001, one portable terminal 1002, and one display apparatus 1003. However, each device may include a plurality of devices connected.

[Arrangement of Voice Control Device 1001]

Figure 2:
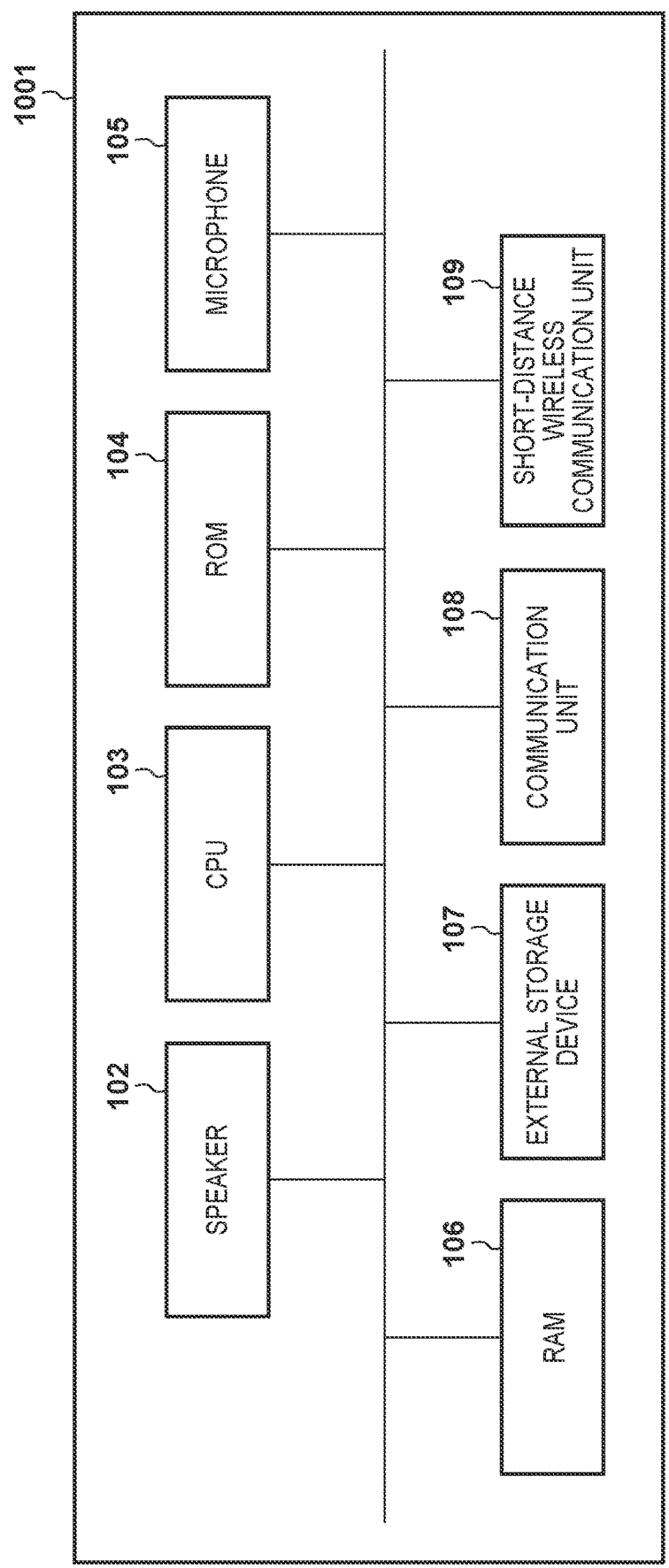
FIG. 2 is a block diagram showing the hardware arrangement of a voice control device.

FIG. 2 is a block diagram showing the hardware arrangement of the voice control device 1001. The voice control device 1001 includes a speaker 102, a CPU 103, a ROM 104, a microphone 105, a RAM 106, an external storage device 107, a communication unit 108, and a short-distance wireless communication unit 109. Note that the blocks shown in FIGS. 2 to 4 and 8 are connected to each other using, for example, an internal bus. In addition, CPU is the acronym of Central Processing Unit, ROM is the acronym of Read Only Memory, and RAM is the acronym of Random Access Memory. Note that the components are merely examples, and each device may include hardware other than the illustrated pieces of hardware. A plurality of blocks shown in FIGS. 2 to 4 and 8 may be integrated into one block and thus implemented. Alternatively, one block may be divided into two or more blocks and thus implemented. That is, each device can have an arbitrary arrangement within a scope in which processing to be described later can be executed.

The speaker 102 generates a voice by processing to be described later. The CPU 103 is a system control unit and controls the entire voice control device 1001. The ROM 104 stores fixed data such as control programs to be executed by the CPU 103, data tables, and an embedded OS (Operating System) program. In this embodiment, the control programs stored in the ROM 104 are used to perform software execution control such as scheduling, task switching, and interrupt processing under the management of the embedded OS stored in the ROM 104. The microphone 105 receives a voice on the periphery of the voice control device. When a voice uttered by a user is received, the voice is converted into electronic data via the microphone 105 and stored in the RAM 106. For example, the RAM 106 that receives the voice uttered by the user is formed by an SRAM (Static RAM) or the like which needs a backup power supply. Note that the RAM 106 holds data by a primary battery (not shown) for data backup and can therefore store data such as a program control variable without volatilizing it. In addition, a memory area to store the setting information and management data of the voice control device 1001 is also provided in the RAM 106. The RAM 106 is also used as the main memory and the work memory of the CPU 103. The external storage device 107 stores application software.

The communication unit 108 includes a circuit and an antenna configured to perform communication in accordance with a predetermined wireless communication method. For example, the communication unit 108 can be wirelessly connected to the AP 1005. In addition, the communication unit 108 sometimes operates as an AP that is temporarily used. Note that the AP 1005 can be, for example, a device such as a wireless LAN router. The wireless communication used in this embodiment may have a capability of operating in accordance with the wireless communication method of a wireless LAN complying with the IEEE 802.11 standard series or may have a capability of operating in accordance with another wireless communication method. The IEEE 802.11 standard series includes a series of standards belonging to IEEE 802.11, like IEEE 802.11a and IEEE 802.11b.

The short-distance wireless communication unit 109 executes short-distance wireless communication with another device existing within a predetermined short-distance range from the voice control device 1001. Note that the short-distance wireless communication unit 109 performs communication using a wireless communication method different from that of the communication unit 108. In this embodiment, the short-distance wireless communication unit 109 operates in accordance with the Bluetooth® standard. Additionally, in this embodiment, the communication speed of the wireless communication using the communication unit 108 is higher than the communication speed of the short-distance wireless communication using the short-distance wireless communication unit 109. Furthermore, in this embodiment, the communication distance of the wireless communication using the communication unit 108 is longer than the communication distance of the short-distance wireless communication using the short-distance wireless communication unit 109. Note that this also applies to the communication units and the short-distance wireless communication units of other apparatuses to be described later.

[Arrangement of Portable Terminal 1002 and Display Apparatus 1003]

Figure 3:
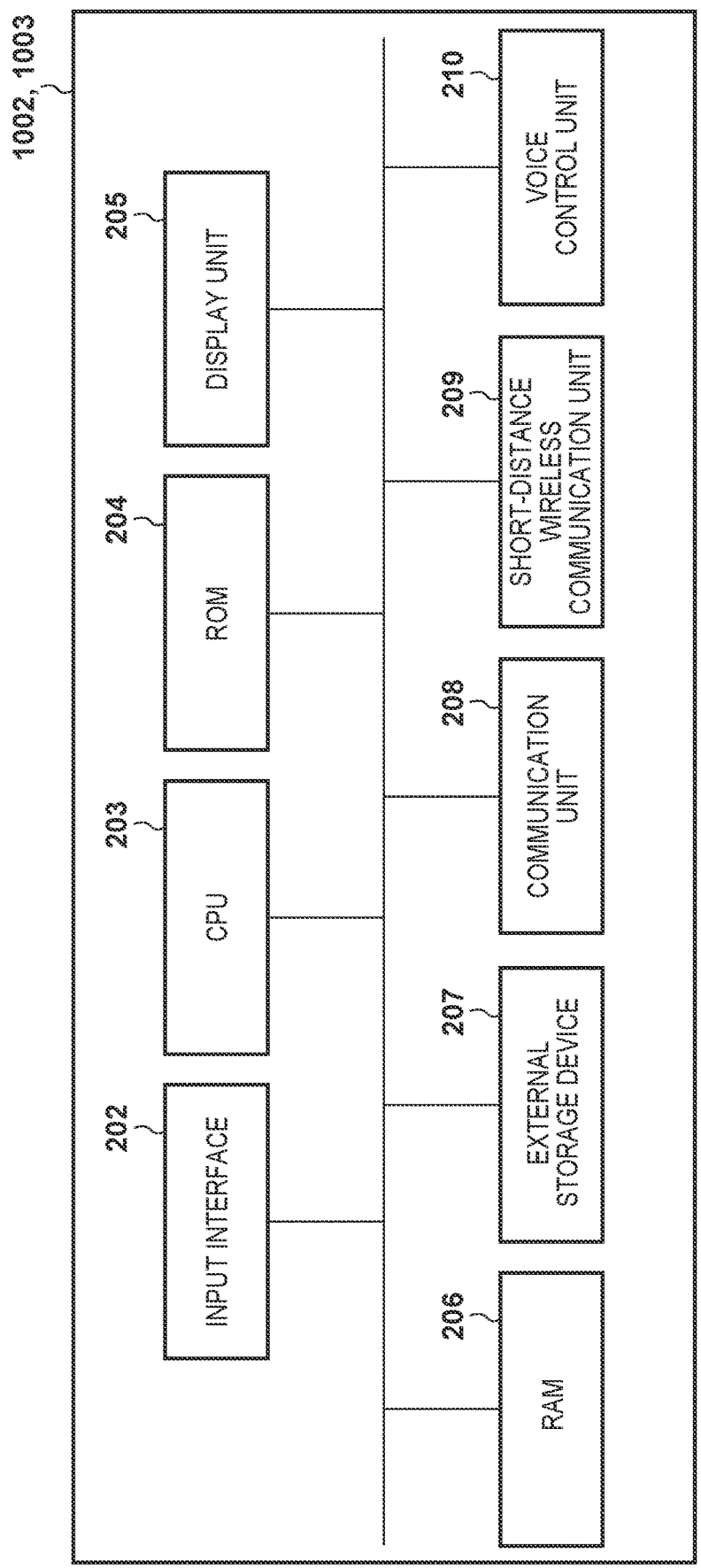
FIG. 3 is a block diagram showing the hardware arrangement of a portable terminal and a display apparatus.

FIG. 3 is a block diagram showing the hardware arrangement of the portable terminal 1002 and the display apparatus 1003. Each of the portable terminal 1002 and the display apparatus 1003 includes, for example, an input interface 202, a CPU 203, a ROM 204, a display unit 205, a RAM 206, an external storage device 207, a communication unit 208, and a short-distance wireless communication unit 209. Note that these blocks are connected to each other using, for example, an internal bus.

The CPU 203 is a system control unit and controls the entire apparatus. The RAM 206 is formed by a DRAM (Dynamic RAM) or the like which needs a backup power supply, like, for example, the RAM 106. The RAM 206 is also used as the main memory and the work memory of the CPU 203. The ROM 204 stores fixed data such as control programs to be executed by the CPU 203, data tables, and an OS program.

The communication unit 208 has the same function as that of the above-described communication unit 108 and can be wirelessly connected to another device via the AP 1005. The short-distance wireless communication unit 209 is a device capable of performing short-distance wireless communication with the short-distance wireless communication unit 109 using the same wireless communication method as that of the short-distance wireless communication unit 109.

In this embodiment, the portable terminal 1002 and the display apparatus 1003 are explained as independent different apparatuses. However, they may be integrated. That is, for example, the portable terminal 1002 may be used as the display apparatus 1003. In addition, the portable terminal 1002 may be used as the voice control device 1001. In this case, the portable terminal 1002 may include, for example, a voice control unit 210 that operates with the functions of both the speaker 102 and the microphone 105. The voice control unit 210 can receive, by the microphone, a language uttered as a voice by the user. The CPU 203 analyzes the language, thereby converting the voice into an electronic instruction. For example, when the user utters a device name by voice, the voice data is received and analyzed, thereby recognizing it as the ID of a specific device. In addition, contents stored in the RAM 206 can be converted into a language understandable by a human and output as a voice from the speaker. For example, a list of device IDs held in the RAM 206 can be converted into a language (names or the like) understandable by a human and output as a voice.

[Arrangement of Communication Apparatus 1004]

Figure 4:
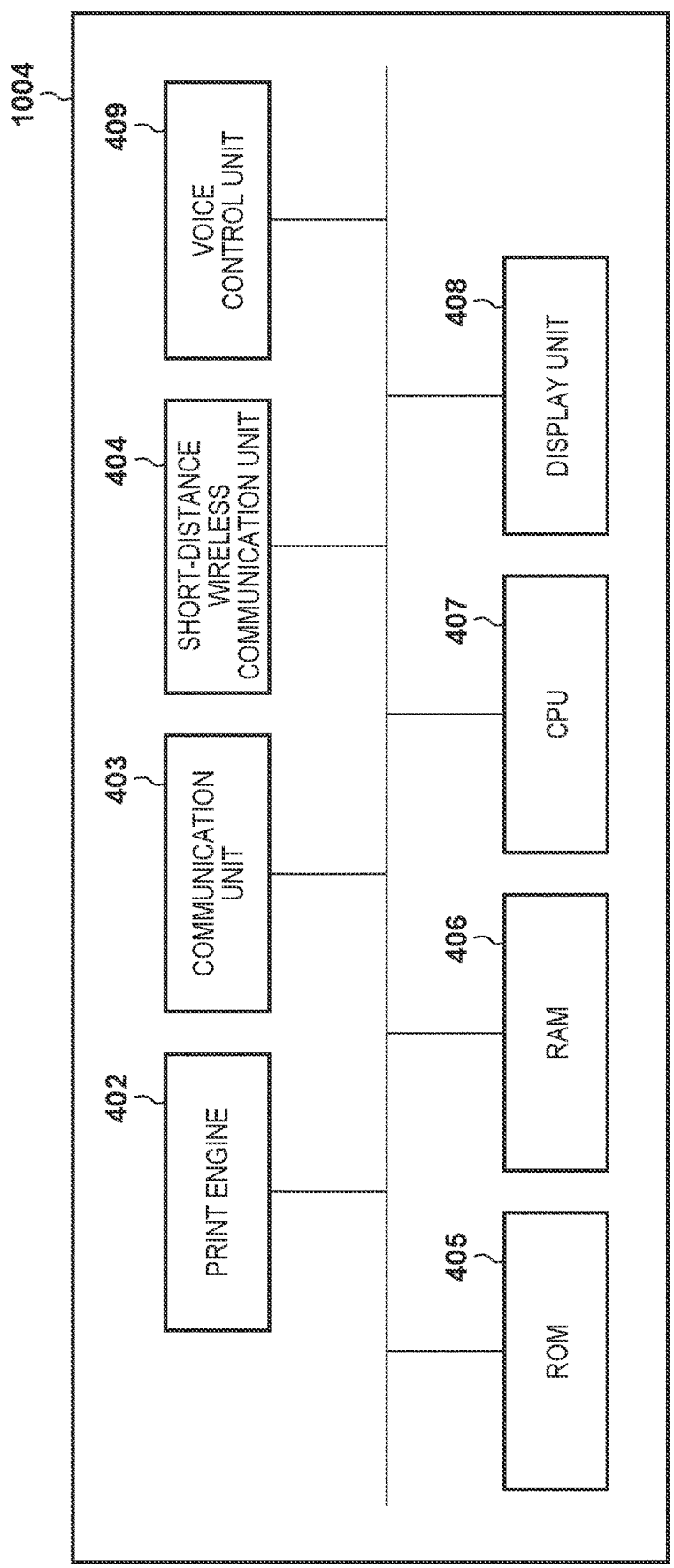
FIG. 4 is a block diagram showing the hardware arrangement of a communication apparatus.

FIG. 4 is a block diagram showing the hardware arrangement of the communication apparatus 1004. The communication apparatus 1004 includes, for example, a print engine 402, a communication unit 403, a short-distance wireless communication unit 404, a ROM 405, a RAM 406, a CPU 407, a display unit 408, and a voice control unit 409. The CPU 407 is a system control unit and controls the entire communication apparatus 1004. The RAM 406 is formed by a DRAM (Dynamic RAM) or the like which needs a backup power supply, like, for example, the RAM 106. The RAM 406 is also used as the main memory and the work memory of the CPU 407. The ROM 405 stores fixed data such as control programs to be executed by the CPU 407, data tables, and an OS program. The communication unit 403 has the same function as that of the above-described communication unit 108 and can be wirelessly connected to another device via the AP 1005. The short-distance wireless communication unit 404 is a device capable of performing short-distance wireless communication with the short-distance wireless communication unit 109 using the same wireless communication method as that of the short-distance wireless communication unit 109. The print engine 402 forms an image on a print medium such as paper using a printing material such as ink based on a print job received via the communication unit 403 and outputs the printing result. The display unit 408 is an interface configured to receive a data input or operation instruction from the user and includes an operation panel formed by a physical keyboard and buttons, a touch panel, or the like.

The voice control unit 409 can receive, by a microphone, a language uttered as a voice by the user. The CPU 407 analyzes the language, thereby converting the voice into an electronic instruction. For example, when the user utters a device name by voice, the voice data is received and analyzed, thereby recognizing it as the ID of a specific device. In addition, contents stored in the RAM 406 can be converted into a language understandable by a human and output as a voice from a speaker. For example, a list of device IDs held in the RAM 406 can be converted into a language (names or the like) understandable by a human and output as a voice.

[Setup of Voice Control Device 1001]

Figure 5:
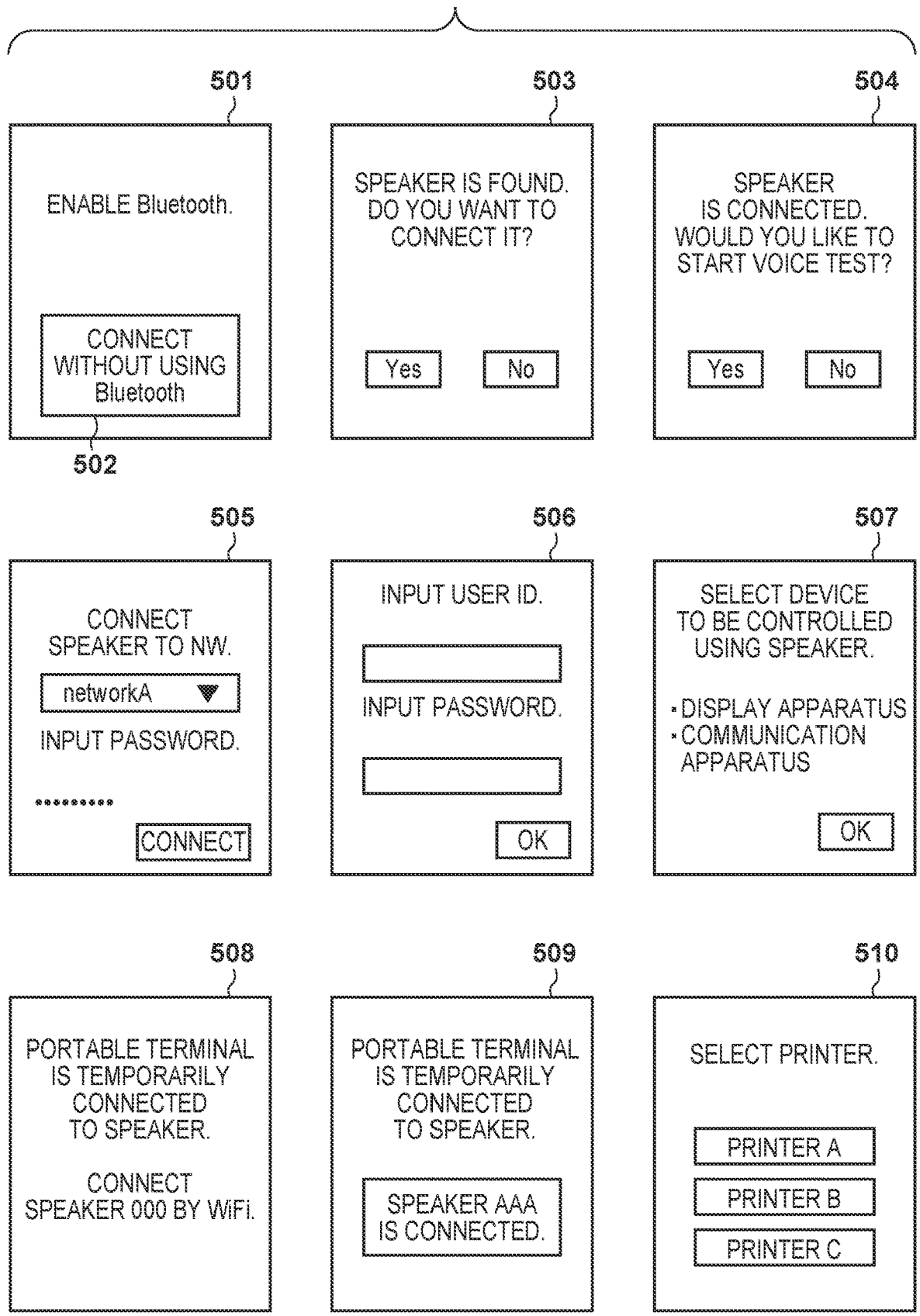
FIG. 5 is a view showing screens associated with setup of the voice control device.

Setup of the voice control device 1001 will be described next. Note that FIG. 5 shows examples of screens displayed by the portable terminal 1002 for setup of the voice control device 1001. A management application for the voice control device is installed in advance in the portable terminal 1002.

When the user activates the management application, a screen 501 is displayed on the display unit 205 of the portable terminal 1002. Here, the user enables the short-distance wireless communication unit 209 (for example, Bluetooth) of the portable terminal 1002 in accordance with a message displayed on the screen 501. When the voice control device 1001 is activated, it generates a beacon including a specific identifier. If the beacon generated by the voice control device 1001 is found using the management application, the portable terminal 1002 displays a screen 503. When the "Yes" button is pressed on the screen 503, the portable terminal 1002 and the voice control device 1001 establish short-distance wireless connection.

When the short-distance wireless connection between the portable terminal 1002 and the voice control device 1001 is established, a screen 504 is displayed on the display unit 205 of the portable terminal 1002. Here, when the user presses the "Yes" button on the screen 504, voice data is transmitted from the portable terminal 1002 to the voice control device 1001 via the short-distance wireless connection, and a voice is output from the speaker 102 to the voice control device 1001. Note that the portable terminal 1002 may transmit a notification instruction by voice to the voice control device 1001 via the short-distance wireless connection, and the voice may thus be output from the speaker 102 of the voice control device 1001. If the voice is output from the voice control device 1001, the user presses a "test completion button" displayed next to the screen 504, whereby a screen 505 is displayed on the display unit 205 of the portable terminal 1002.

Here, the user inputs the SSID and the password of an AP that should be connected to the voice control device 1001 to the screen 505 and presses the connect button. Basically, the user inputs, using the screen 505, the SSID and the password of the AP 1005 to which the portable terminal 1002 is wirelessly connected using the communication unit 208. With this processing, the portable terminal 1002 transmits the SSID and the password to the voice control device 1001 via the short-distance wireless connection. The voice control device 1001 establishes wireless connection with the AP 1005 using the SSID and the password received via the short-distance wireless connection. With the above-described processing, the voice control device 1001 and the portable terminal 1002 can perform wireless communication via the AP 1005 (via the network formed by the AP 1005).

Next, the user inputs a user ID and a password needed to log in to the server 1006 using a screen 506 displayed on the portable terminal 1002. Note that the user ID and the password input in the screen 506 are transmitted from the portable terminal 1002 to the voice control device 1001 via the short-distance wireless connection or the AP 1005. The voice control device 1001 signs in to the server 1006 using the user ID and the password received from the portable terminal 1002. At this time, the voice control device 1001 transmits the Mac address of itself as well. This allows the voice control device 1001 to use a service provided by the server 1006 to the user. That is, the server 1006 manages the Mac address of the voice control device 1001 and the user ID in association with each other. Here, the voice control device 1001 may receive the access token of the server 1006.

Using a screen 507 displayed next to the screen 506, the user selects a device to be controlled using the voice control device 1001. Assume here that the user selects the display apparatus 1003 and the communication apparatus 1004.

Devices displayed on the screen 507 are displayed when the portable terminal 1002 searches for the devices via the AP 1005. At this time, as the result of device search processing, the portable terminal 1002 acquires the Mac address, IP address, and the like of each device at the time of the device search. For this reason, when the OK button is pressed in the screen 507, the portable terminal 1002 transmits the Mac address and the IP address of each device to the voice control device 1001.

Note that setup of the voice control device 1001 may be performed using another method. For example, when the voice control device 1001 is activated (or a setup mode is enabled), the communication unit 108 of the voice control device 1001 operates as a software AP. For example, when "connect without using Bluetooth" 502 is pressed on the screen 501, the portable terminal 1002 displays a screen 508. The user operates the portable terminal 1002 in accordance with contents displayed on the screen 508. By this user operation, the portable terminal 1002 establishes wireless connection with the voice control device 1001 using the communication unit 208. Note that the portable terminal 1002 may establish the wireless connection with the software AP of the voice control device 1001 in accordance with an instruction of the management application. That is, the connection destination of the communication unit 208 of the portable terminal 1002 is temporarily switched from the AP 1005 to the software AP of the communication unit 108 of the voice control device 1001 in accordance with a user operation or an instruction of the management application. When the wireless connection is established between the communication unit 208 of the portable terminal 1002 and the communication unit 108 of the voice control device 1001, a screen 509 is displayed.

Note that as subsequent processing, information input to the screen 505 is transmitted via the wireless connection established between the communication unit 208 of the portable terminal 1002 and the communication unit 108 of the voice control device 1001. After that, to perform wireless communication between the portable terminal 1002 and the voice control device 1001 via the AP 1005, the portable terminal 1002 switches the connection destination to the AP 1005. In addition, the voice control device 1001 disables the software AP and is wirelessly connected to the AP 1005 using the communication unit 108.

As described above, the voice control device 1001 establishes wireless connection with the portable terminal 1002 by wireless communication via the access point provided in the voice control device 1001. Using this wireless connection, the voice control device 1001 can execute the first reception processing of receiving the pieces of information (the SSID, the password, and the like) concerning the external access point 1005 from the portable terminal 1002. In addition, the voice control device 1001 can execute the second reception processing of receiving the pieces of information (the SSID, the password, and the like) concerning the external access point 1005 from the portable terminal 1002 via the short-distance wireless communication. The voice control device 1001 may have only one of the two reception processing functions described above or may have both the reception processing functions. Alternatively, the voice control device 1001 may be connected to the external access point 1005 by another reception processing function.

[Sign-In Processing of Communication Apparatus 1004 to Server 1006]

Processing of causing the communication apparatus 1004 to sign in to the server 1006 will be described next. For example, in the Internet, the server 1006 corresponding to the voice control device 1001 and a server 1007 that does not correspond to the voice control device 1001 exist. To implement cooperation between the voice control device 1001 and the communication apparatus 1004, the communication apparatus 1004 needs to sign in not to the server 1007 but to the server 1006.

Figure 6:
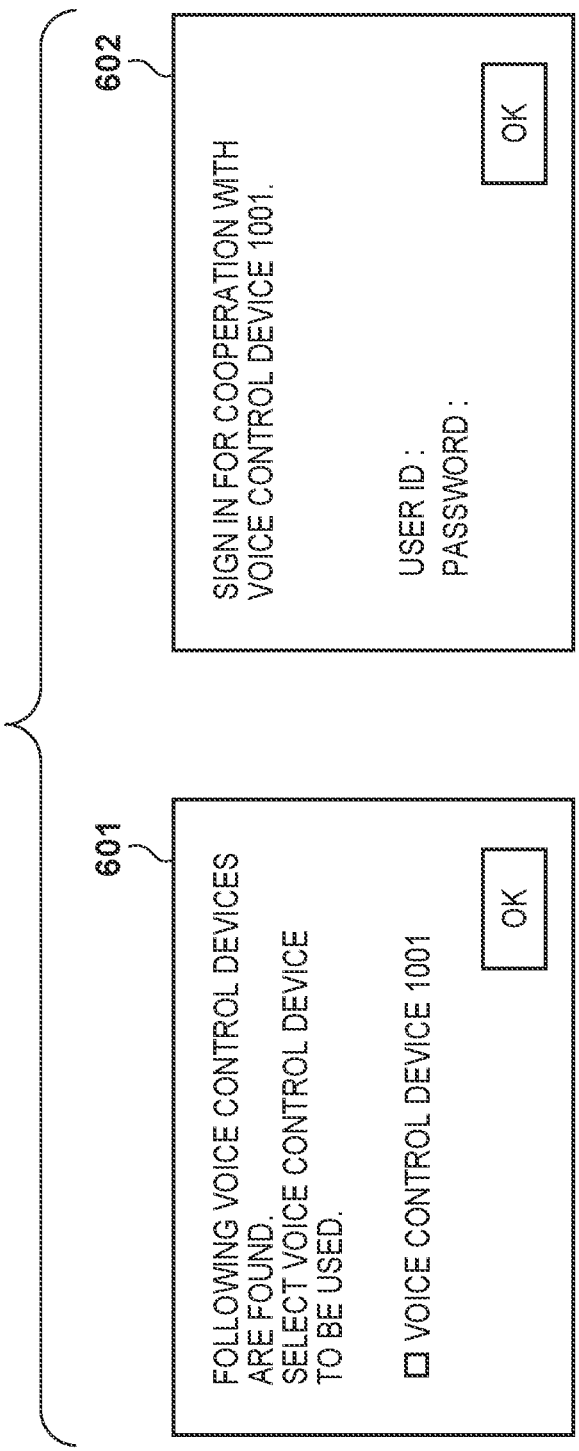
FIG. 6 is a view showing screens displayed by the communication apparatus.

For this purpose, the communication apparatus 1004 has a voice control device cooperation mode. When the voice control device cooperation mode is enabled, the communication apparatus 1004 performs a device search in the network in which it participates and finds the voice control device 1001. When the voice control device 1001 is found, a screen 601 shown in FIG. 6 is displayed on the display unit 408 of the communication apparatus 1004. When the user selects the voice control device 1001 and presses the OK button on the screen 601, a screen 602 is displayed on the display unit 408 of the communication apparatus 1004. Note that information acquired by the device search includes, for example, the URL of the server 1006 corresponding to the voice control device 1001. Using the URL, the communication apparatus 1004 can display the screen 602 used to sign in to the server 1006. The communication apparatus 1004 can sign in to the server 1006 using information input to the screen 602. With the above-described processing, the communication apparatus 1004 can sign in to the server 1006 and handle image data managed by the server 1006. In addition, when the communication apparatus 1004 performs the device search, and the voice control device 1001 corresponding to the server 1007 is thus found, the communication apparatus 1004 displays a screen used to sign in to the server 1007.

Note that another process may be executed as the processing of causing the communication apparatus 1004 to sign in to the server 1006. An example of the other processing will be described. First, a state in which the portable terminal 1002 has completed sign-in to the server 1006 is obtained. For example, the user signs in to the server 1006 using the above-described screen 506. When the portable terminal 1002 finds the communication apparatus 1004 via the AP 1005, the portable terminal 1002 displays the identification information of the communication apparatus 1004 and a registration button. For example, the registration button may be displayed next to the communication apparatus in the screen 507. Here, if the user presses the registration button, a registration request is transmitted from the portable terminal 1002 to the communication apparatus 1004. Note that the registration request includes the destination information of the server 1006.

Upon receiving the registration request, the communication apparatus 1004 displays, on the display unit 408 of the communication apparatus 1004, a selection screen to select whether to execute registration processing of the communication apparatus 1004. Here, if the user selects execution of registration processing, the communication apparatus 1004 transmits a registration request including the Mac address of the communication apparatus 1004 to the server 1006 in accordance with the destination information included in the registration request. The communication apparatus 1004 then receives a response to the registration request from the server 1006. Note that the response includes a URL concerning the registration processing of the communication apparatus 1004. That is, the URL is a dedicated URL concerning the registration processing of the communication apparatus 1004.

The communication apparatus 1004 transmits the response received from the server 1006 to the portable terminal 1002. The portable terminal 1002 transmits a registration request to the server 1006 using the URL included in the received response. The registration request includes the user ID and the password already input to the portable terminal 1002 to sign in to the server 1006. If the correct user ID and password are received, the server 1006 that has received the registration request transmits a response representing that the registration request has succeeded to the portable terminal 1002. That is, since the registration request is received using the dedicated URL concerning the registration processing of the communication apparatus 1004, the server 1006 temporarily registers the communication apparatus 1004 as a printing apparatus for the user who has signed in to the portable terminal 1002. The server 1006 manages the user ID and the Mac address of the communication apparatus 1004 in association with each other. The portable terminal 1002 transmits completion information representing that the registration is completed to the communication apparatus 1004. Upon receiving the completion information, the communication apparatus 1004 transmits a registration request including the Mac address of the communication apparatus 1004 to the server 1006. The server 1006 identifies that the communication apparatus 1004 is in a temporarily registered state and returns a registration completion response.

With the above-described processing, the server 1006 formally registers the communication apparatus 1004 as the printing apparatus for the user has signed in to the portable terminal 1002. Upon receiving the registration completion response from the server 1006, the communication apparatus 1004 transmits information representing registration completion to the portable terminal 1002. With the above-described processing, the communication apparatus 1004 may be unable to handle image data managed by the server 1006.

[Processing Procedure of Print Instruction]

Figure 7:
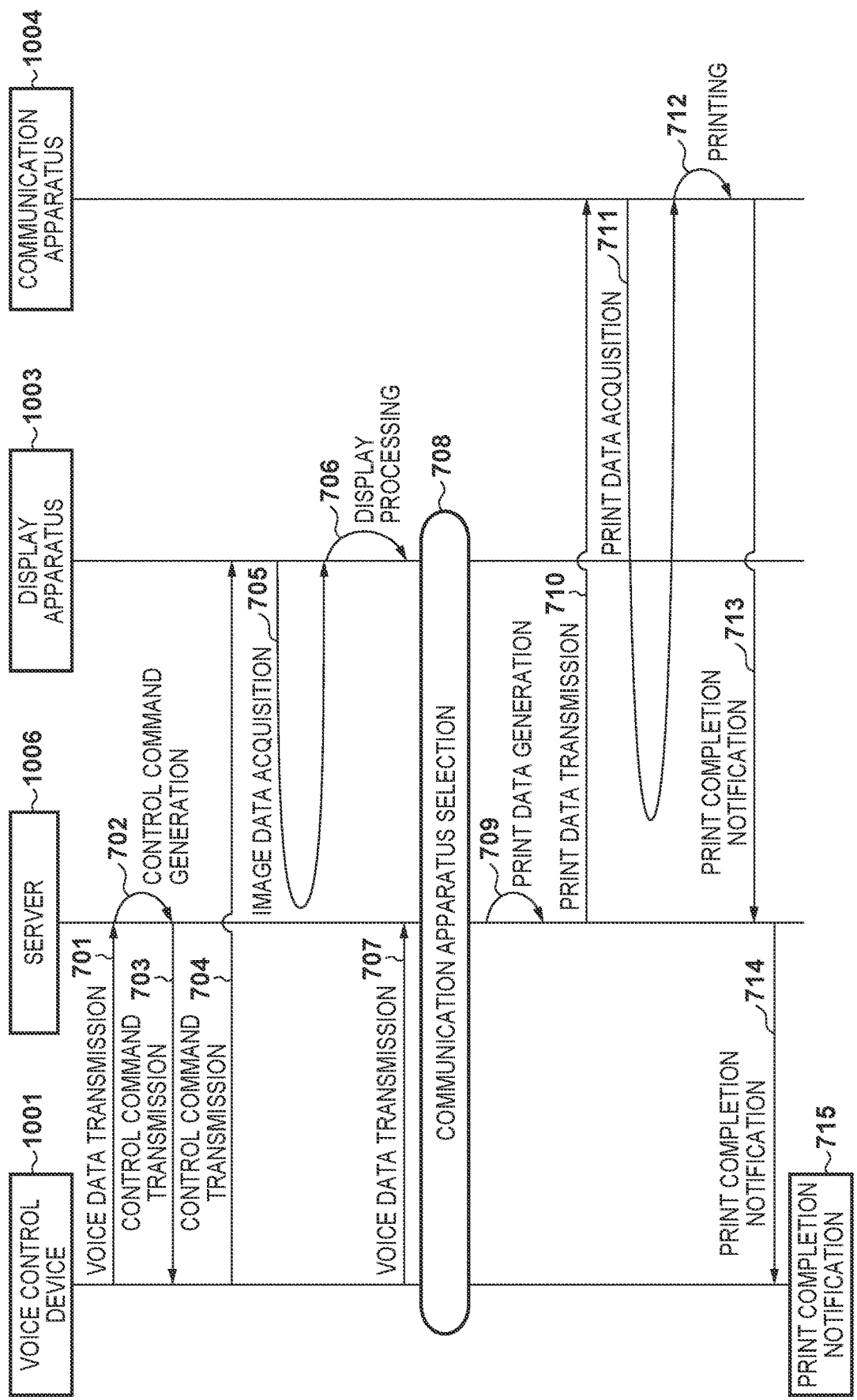
FIG. 7 is a sequence chart showing a sequence associated with print processing.

FIG. 7 is a sequence chart for explaining processing in which the voice control device 1001 selects the communication apparatus 1004 based on a print instruction by a voice uttered from the user and then executes print processing. Note that the display apparatus 1003 has already signed in to the server 1006. In addition, image data corresponding to a photo A to be described later is saved for the user by the server 1006.

Near the voice control device 1001, the user utters a wake word that is a predetermined keyword first and then utters what the user himself/herself wants to do. For example, the user utters the wake word and then utters "display the photo A".

The voice control device 1001 receives the voice of the wake word, thereby receiving the voice uttered next. That is, the voice control device 1001 receives the voice "display the photo A". The voice control device 1001 transmits the identification information (for example, the Mac address) of the voice control device 1001 and voice data based on the received voice to the server 1006 (process 701).

The server 1006 specifies, from the Mac address of the voice control device 1001, the user ID associated with the Mac address, thereby recognizing that the voice control device 1001 is a device that has already signed in. The above-described access token may be used. The server 1006 analyzes the voice data transmitted from the voice control device 1001, generates a control command based on the voice data (process 702), and transmits the control command to the voice control device 1001 (process 703). Note that the control command includes a display processing command as processing contents to be executed and information representing the storage location of image data corresponding to the photo A as the display target.

The voice control device 1001 selects the transmission target of the control command received from the server 1006. Here, since the user utters "display the photo A" as the request from the user, the voice control device 1001 selects the display apparatus 1003 as the transmission destination. The voice control device 1001 transmits the control command to the selected display apparatus 1003 (process 704). Note that although the voice control device 1001 transmits the control command received from the server 1006 in the process 704, another command may be transmitted. That is, the voice control device 1001 may generate another command based on the control command received in the process 703 and transmit the other generated command to the display apparatus 1003. The process in which the voice control device 1001 transmits a control command is described even in the following description (for example, the process 704 in FIG. 10 and the like). Another command generated based on the control command may be transmitted similarly. In this case, the device that has received the command can execute processing according to the other command.

The display apparatus 1003 executes processing according to the control command. The display apparatus 1003 first accesses the storage location included in the control command and acquires image data corresponding to the photo A from the storage location (process 705). Then, the display apparatus 1003 displays image data A corresponding to the photo A (process 706). Note that if a URL corresponding to the photo A is included in the control command, the display apparatus 1003 may access the URL, thereby displaying a web page including the photo A.

Next, near the voice control device 1001, the user utters the wake word first and then utters what the user himself/herself wants to do. For example, the user utters the wake word and then utters "print the photo A displayed on the display apparatus 1003".

The voice control device 1001 receives the voice of the wake word, thereby receiving the word uttered next. That is, the voice control device 1001 receives the voice "print the photo A displayed on the display apparatus 1003", thereby receiving a print instruction by the voice. The voice control device 1001 transmits the voice data to the server 1006 (process 707). Note that the basic process is the same as the process 701.

If an instruction to designate the communication apparatus 1004 is included in the voice of the user, a communication apparatus desired by the user is selected by communication apparatus selection (process 708). For example, if voice data "print the photo A displayed on the display apparatus 1003 by the communication apparatus B 10042" is received, control is performed to select the communication apparatus B 10042 by communication apparatus selection (process 708). Even if the instruction to designate the communication apparatus 1004 is not included in the voice of the user, some communication apparatus needs to be selected to perform printing. The selection method will be described later with reference to FIG. 9.

The server 1006 analyzes the voice data transmitted from the voice control device 1001 and executes processing based on the voice data. Here, since the voice data of the voice "print the photo A displayed on the display apparatus 1003" is received, the server 1006 generates print data based on the image data corresponding to the photo A (process 709). Note that as the process 709, another server different from the server 1006 may generate print data. For example, the manufacturer of the communication apparatus 1004 may provide a print server including software configured to generate print data. The server 1006 may request the print server to generate print data, and the print server may generate print data.

When the generation of print data is completed, the server 1006 transmits a notification representing that the generation of print data is completed to the communication apparatus 1004 (process 710). Upon receiving the notification representing that the generation of print data is completed, the communication apparatus 1004 accesses the server 1006, acquires the print data (process 711), and executes printing (process 712).

When the print processing is completed, the communication apparatus 1004 transmits a print completion notification to the server 1006 (process 713), and the server 1006 transmits the print completion notification to the voice control device 1001 (process 714). Upon receiving the print completion notification, the voice control device 1001 notifies the print completion by voice (process 715).

In addition, after the print completion is notified and before printing using another print data is instructed, near the voice control device 1001, the user utters the wake word first and then utters what the user himself/herself wants to do. For example, the user utters the wake word and then utters a copy addition instruction such as "one more copy" or "additionally print three copies".

Upon receiving the copy addition instruction, the voice control device 1001 may transmit the voice data transmitted in the process 707 again. At this time, voice data corresponding to "one more copy" or "additionally print three copies" is also transmitted together. The server 1006 receives the two voice data, thereby performing the same print data generation processing as in the process 709. The server 1006 sets the number of copies based on the voice data of the new request. With this processing, the user can easily instruct re-printing using the same image data.

Furthermore, after the print completion is notified and before printing using another print data is instructed, near the voice control device 1001, the user utters the wake word first and then utters what the user himself/herself wants to do. For example, the user utters the wake word and then utters "print on a larger sheet". Upon receiving the instruction, the voice control device 1001 may transmit the voice data transmitted in the process 707 again. At this time, voice data corresponding to "print on a larger sheet" is also transmitted together. The server 1006 receives the two voice data, thereby performing the same print data generation processing as in the process 709. The server 1006 sets the paper size based on the voice data of the new request. With this processing, the user can easily instruct to print the same image data on a sheet of a different size. Note that when another device, for example, the voice control device 1001 or the display apparatus 1003 generates print data, as will be described later, the device that generates print data may perform the same processing.

In addition, when the user utters "print the same data by the communication apparatus C 10043", only the communication apparatus can be changed while the print data remains unchanged. Upon receiving the instruction, the voice control device 1001 may transmit the voice data transmitted in the process 707 again. At this time, voice data corresponding to "print the same data by the communication apparatus C 10043" is also transmitted together. The server 1006 receives the two voice data, thereby transmitting a notification representing that the generation of print data is completed to the communication apparatus C 10043. With this processing, the user can easily instruct to print the same image data by a different communication apparatus.

[Arrangement of Server 1006]

Figure 8:
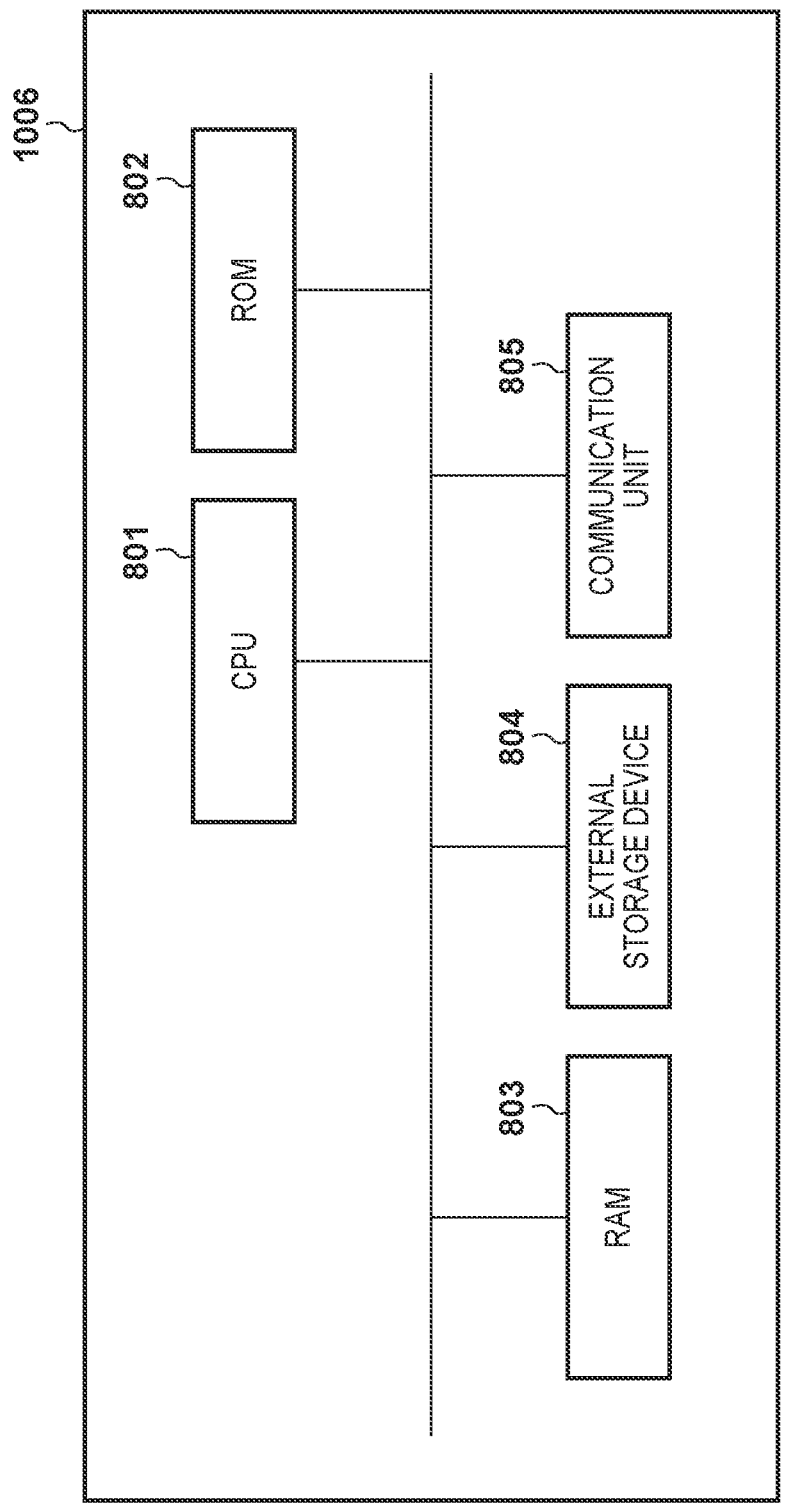
FIG. 8 is a block diagram showing the hardware arrangement of a server.

FIG. 8 is a block diagram showing the hardware arrangement of the server 1006. The server 1006 include a CPU 801, a ROM 802, a RAM 803, an external storage device 804, and a communication unit 805. The CPU 801 is a system control unit and controls the entire server 1006. Note that in this embodiment, the server 1006 is formed by one server. However, a server system corresponding to the server 1006 may be formed by causing a plurality of information processing apparatuses to cooperatively operate. The ROM 802 stores fixed data such as control programs to be executed by the CPU 801, data tables, and an embedded OS (Operating System) program. The RAM 803 can store data such as a program control variable without volatilizing it because the data is held by a primary battery (not shown) for data backup. The external storage device 804 stores application software. Note that in FIG. 7, the server 1006 generates print data, as described above. For this reason, the external storage device 804 of the server 1006 stores print software that generates print data interpretable by the communication apparatus 1004. The communication unit 805 includes a circuit and an antenna configured to perform communication in accordance with a predetermined wireless communication method.

[Details of Processing of Voice Control Device 1001 and Server 1006]

Figure 9:
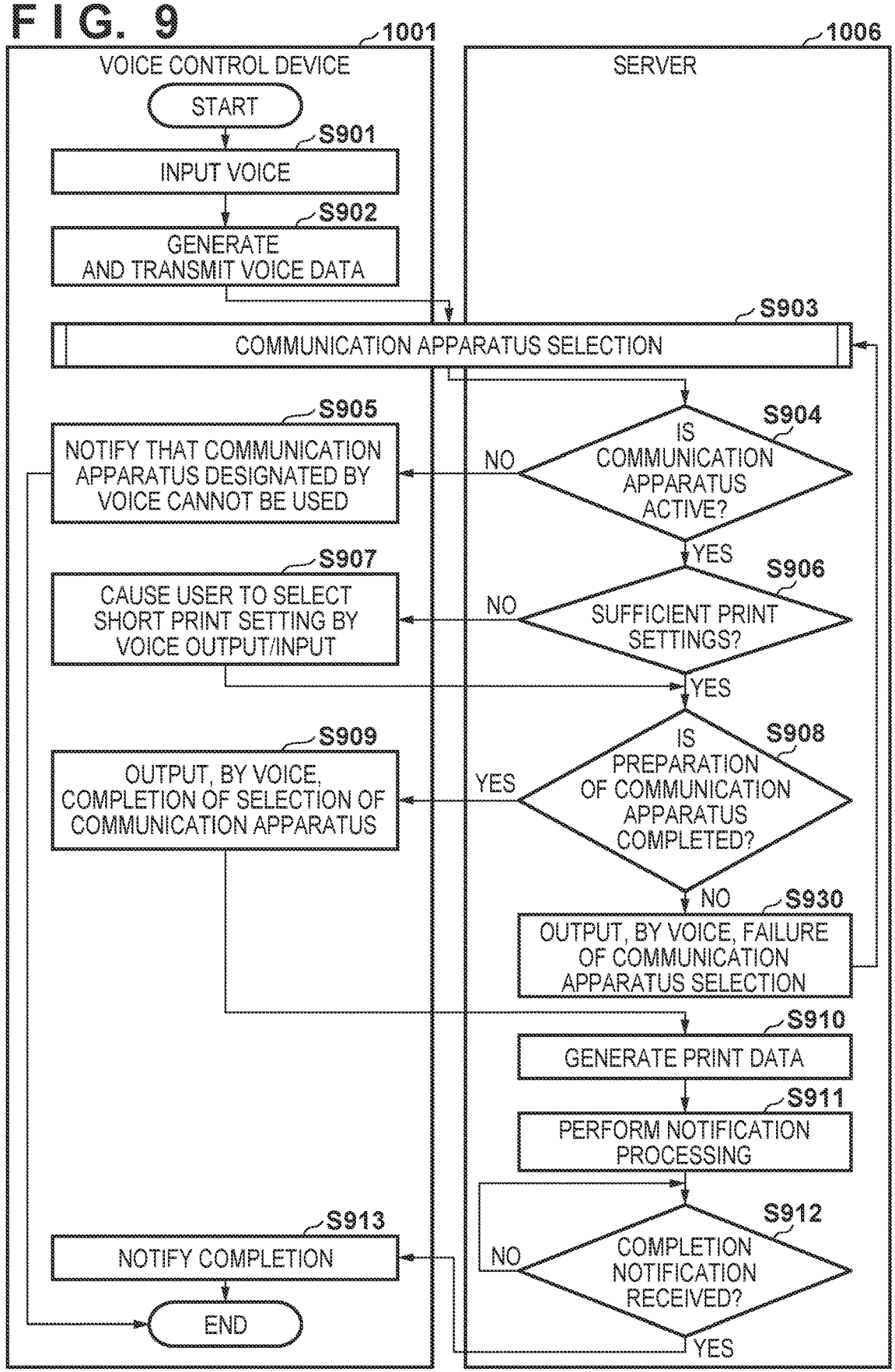
FIG. 9 is a flowchart showing the processing of the voice control device and the server.
Figure 10:
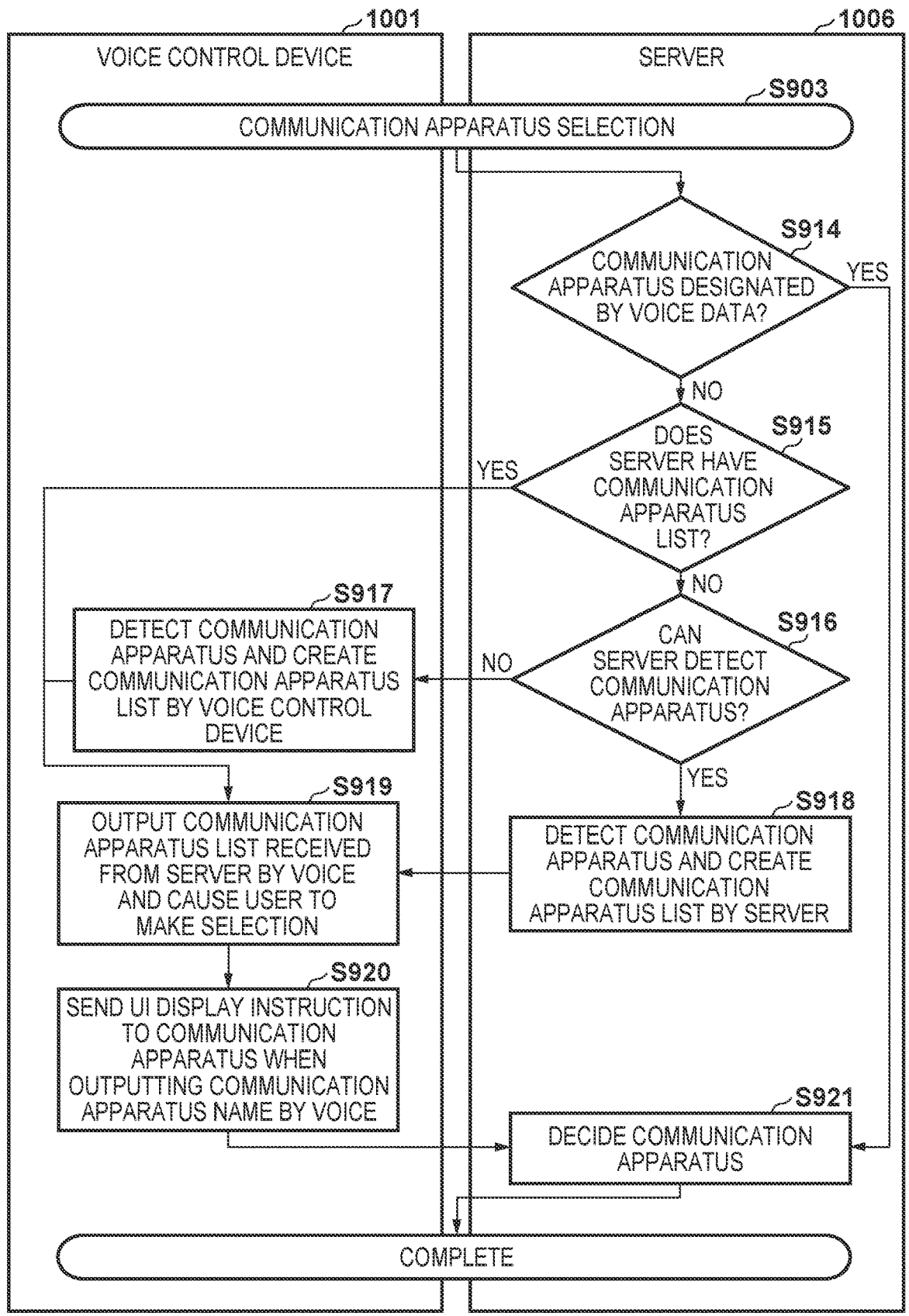
FIG. 10 is a flowchart showing the processing of the voice control device and the server.
Figure 11:
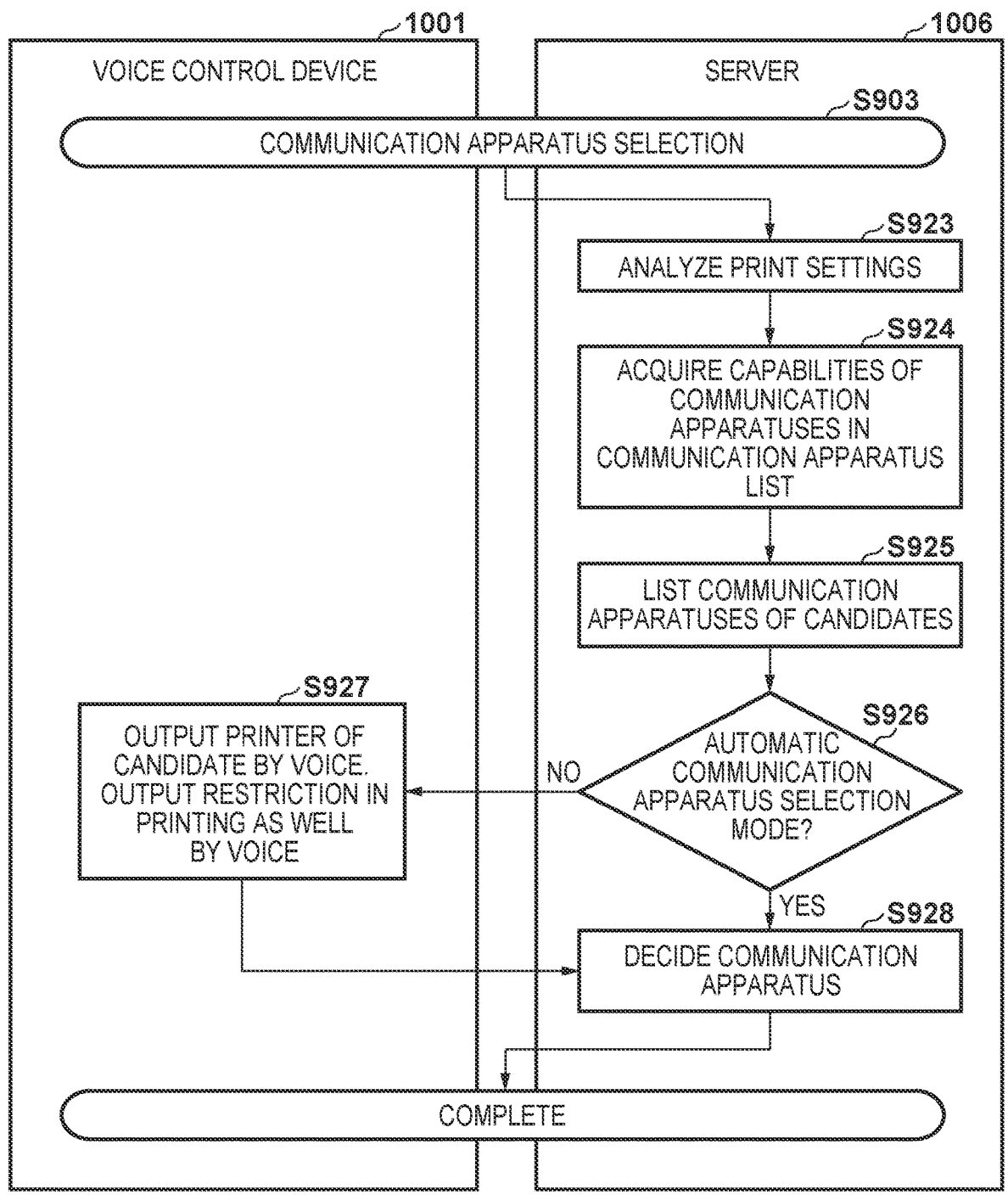
FIG. 11 is a flowchart showing the processing of the voice control device and the server.

Processing of the voice control device 1001 and the server 1006 will be described next with reference to FIG. 9. The flowchart of FIG. 9 corresponds to the processes 707 to 715 in FIG. 7. FIGS. 10 and 11 respectively show other examples of the sub-sequence of step S903 according to the embodiment. Note that when the CPU 103 loads a program concerning the processing of the flowchart from a memory such as the ROM 104 and executes the program, the processing of the voice control device 1001 is executed. On the other hand, when the CPU 801 loads a program concerning the processing of the flowchart from a memory such as the ROM 802 and executes the program, the processing of the server 1006 is executed.

The CPU 103 inputs words (voice) uttered by the user on the periphery of the voice control device 1001 (step S901) and generates voice data based on the input voice. Then, the voice data is transmitted from the voice control device 1001 to the server 1006 (step S902). Upon receiving the voice data, the CPU 801 analyzes the voice data and specifies the request of the user. Next, communication apparatus selection processing S903 is executed. Step S903 will be described in detail with reference to FIG. 10. In step S914 of FIG. 10, the CPU 801 analyzes whether the communication apparatus 1004 is designated by the voice data. For example, if the voice is the voice "print the photo A displayed on the display apparatus 1003", the communication apparatus 1004 is not designated and, therefore, the process advances to step S915. On the other hand, if the voice is the voice "print the photo A displayed on the display apparatus 1003 by the communication apparatus B 10042", the communication apparatus 1004 is designated and, therefore, the process advances to step S921. In step S921, the CPU 801 decides the communication apparatus 1004 that should perform printing, and step S903 in FIG. 9 ends.

In step S915, the CPU 801 determines whether the server 1006 has a communication apparatus list. The communication apparatus list is a list of communication apparatuses 1004 to which the server 1006 can transmit a print instruction. For example, the communication apparatus 1004 connected to the same AP is added to the communication apparatus list. If the communication apparatus 1004 does not exist on the same AP but can perform communication via a network, the communication apparatus 1004 capable of communicating may be added to the communication apparatus list. If the server 1006 has a communication apparatus list, the CPU 801 transmits the communication apparatus list to the voice control device 1001 and advances to step S919. If the server 1006 does not have a communication apparatus list, the CPU 801 advances to step S916.

In step S916, the CPU 801 determines whether the server 1006 can detect the communication apparatus 1004. As a detection method, for example, a method of executing a device search using polling or a broadcast signal by the server 1006 and adding the communication apparatus 1004 returning a response to that to the communication apparatus list may be used. As another detection method, a method of querying the communication apparatus 1004 existing on the same AP about a capability and adding a device having a predetermined printing capability to the communication apparatus list may be used. If the server 1006 cannot create the communication apparatus list, the process advances to step S917, and the voice control device 1001 creates the communication apparatus list.

In step S917, the CPU 103 acquires the information of the communication apparatus 1004 capable of communicating by, for example, performing a device search and creates the communication apparatus list. In this case, the CPU 103 may transmit the URL of the server 1006 corresponding to the voice control device 1001 to the communication apparatus 1004 found by the device search and promote the communication apparatus to sign in to the server 1006. If the server 1006 can create the communication apparatus list, the process advances to step S918, and the CPU 801 creates the communication apparatus list and transmits it to the voice control device 1001.

In step S919, the CPU 103 outputs, by voice, the communication apparatus 1004 described in the communication apparatus list created by the server 1006 or the communication apparatus list created in step S917. For example, the CPU 103 outputs "communication apparatuses capable of printing are the communication apparatus A, the communication apparatus B, and the communication apparatus C" by voice. In response to this, the user inputs a desired communication apparatus name by voice. The CPU 103 transmits the received voice data to the server 1006. The CPU 801 analyzes the received voice data and, if the communication apparatus 1004 desired by the user can be decided, the process advances to step S921. If the communication apparatus 1004 cannot be decided due to some factor such as timeout, step S919 may be retried.

When the voice control device 1001 outputs the communication apparatus name by voice in step S919, an instruction may be sent to the communication apparatus 1004 to do UI display. For example, when the voice control device 1001 outputs "communication apparatus A" by voice, "Communication apparatus A. It is a candidate of communication apparatus selection" is displayed on the display unit 408 of the communication apparatus A. Since this allows the user to visually confirm the device to do printing now, the possibility of making a wrong selection can be reduced. Note that in the processing shown in FIG. 10, if one communication apparatus is included in the list in step S915, or if one communication apparatus is detected in step S916, steps S917, S919, and S920 may be skipped, and step S921 may be executed.

Another procedure of communication apparatus selection in step S903 will be described with reference to FIG. 11. In step S923, the CPU 801 analyzes print settings. The print settings are, for example, the paper size, paper type, data format, color/monochrome setting, and resolution. In step S924, the CPU 801 acquires the capabilities of the communication apparatuses 1004 listed in the communication apparatus list held by the server 1006. In step S925, the CPU 801 compares the print settings analyzed in step S923 with the capabilities acquired in step S924, and narrows down and lists the communication apparatuses 1004 capable of performing printing.

In step S926, the CPU 801 determines whether the automatic selection mode of the communication apparatus 1004 is set. Here, the automatic selection mode of the communication apparatus 1004 is a setting concerning whether the system automatically selects the appropriate communication apparatus 1004 in a case in which the user does not explicitly select the communication apparatus 1004 at the time of printing. The automatic selection mode of the communication apparatus 1004 may be set by a print job, may be a set value of the server 1006, or may be a set value of the voice control device 1001. If the automatic selection mode of the communication apparatus 1004 is "automatic selection", a communication apparatus is automatically selected based on the print settings analyzed in step S923 and the capabilities acquired in step S924. If there are a plurality of communication apparatuses for which the print settings analyzed in step S923 and the capabilities acquired in step S924 match, for example, the communication apparatus 1004 located at the position closest to the position of the voice control device 1001 instructed by voice may be selected. If the automatic selection mode of the communication apparatus 1004 is "user selection", the CPU 801 transmits the communication apparatus list to the voice control device 1001 and advances to step S927.

In step S927, the CPU 103 outputs the communication apparatuses 1004 of candidates described in the external storage device by voice and causes the user to make a selection. The information of the communication apparatus selected by the user is transmitted to the server 1006. In step S928, the CPU 801 decides the communication apparatus selected by the automatic selection mode of the communication apparatus or the communication apparatus selected by the user in step S927 as the communication apparatus to do printing, and the procedure ends.

Referring back to FIG. 9, the communication apparatus 1004 to do printing is decided via step S903. In step S904, the CPU 801 determines whether the communication apparatus 1004 decided in step S903 is active. In a case in which, for example, ink has run out, the apparatus is not powered on, or paper has run out, the CPU 801 determines that the decided communication apparatus 1004 is not active. Then, the CPU 801 notifies the voice control device 1001 of it and advances to step S905. In step S905, the voice control device 1001 outputs a voice representing that a print job cannot be executed because the communication apparatus 1004 is not active, and the procedure ends.

As another example, if the communication apparatus 1004 that is not active is selected, the process may return to step S903 to select the communication apparatus 1004 again. If the communication apparatus 1004 is active, the process advances to step S906 to start preparation for printing. At this time, the CPU 801 loads the settings of the print job and checks whether there is an insufficiency in the set contents. If there is an insufficiency, the CPU 801 notifies the voice control device 1001 of it. In step S907, the CPU 103 complements the insufficient setting done by the user. For example, if there is no setting for the color mode, the voice control device 1001 makes a query about the set value in consideration of the capability of the communication apparatus 1004 by "do you want color printing or monochrome printing?". The user makes a reply by voice. As still another example, the insufficient set contents may be displayed on the display apparatus 1003 to make the user input. The CPU 103 transmits, to the server 1006, the set contents received as the reply from the user as set values.

In step S908, the CPU 801 checks whether the printing preparation of the communication apparatus 1004 is completed. If the printing preparation is completed, the CPU 801 notifies the voice control device 1001 of it, and advances to step S909. In step S909, the CPU 103 notifies the user of it by voice. If the printing preparation is not completed within a predetermined time, or there is an insufficiency in the settings, the CPU 801 causes the voice control device 1001 to output it in step S930 and returns to step S903 again. The server 1006 can select the communication apparatus that should perform printing in the above-described procedure after it receives voice data corresponding to the user request "print the photo A displayed on the display apparatus 1003". The CPU 801 specifies image data corresponding to the photo A displayed on the display apparatus 1003 and generates print data based on the image data (step S910). Note that print setting information used when generating the print data in step S910 may be information designated by the user by voice in step S901, may be the print settings held by the voice control device 1001, or may be print setting information set in advance for printing using the server 1006. Additionally, processing from step S910 may be executed in parallel to step S909.

The CPU 801 transmits, to the communication apparatus 1004, a notification representing that the generation of print data is completed for the selected printer (communication apparatus 1004) (step S911). By receiving the notification in step S911, the communication apparatus 1004 acquires the print data from the server 1006 and executes print processing. After that, the CPU 801 determines whether a print completion notification is received from the communication apparatus 1004 (step S912). If the print completion notification is received from the communication apparatus 1004 in step S912, the CPU 801 transmits the print completion notification to the voice control device 1001 that is the print instruction source. Upon receiving the print completion notification, the CPU 103 notifies the print completion by voice. More specifically, the CPU 103 converts the print completion notification into a voice and outputs the print completion by voice using the speaker 102 (step S913).

With the above-described processing, the user can print a desired photo by a desired printer by a simple operation.

Processing of selecting, by voice, the communication apparatus 1004 that performs print output has been described above. The processing may be applied to processing of selecting, by voice, the communication apparatus 1004 that performs another output operation, for example, FAX output. In this case, in the process 709 shown in FIG. 7, the server 1006 generates data for FAX transmission. In the process 711, the communication apparatus 1004 acquires the FAX transmission data. The communication apparatus 1004 performs FAX transmission in the process 712 and notifies the server 1006 of the completion of FAX transmission in the process 713. When the server 1006 notifies the voice control device 1001 of the completion of FAX transmission in the process 714, the voice control device 1001 outputs the completion of FAX transmission by voice in the process 715.

An example in which the communication apparatus 1004 performs printing using the notification from the server 1006, which represents that the generation of print data is completed, has been described with reference to FIGS. 7 and 8. An example in which the voice control device 1001 generates print data will be described with reference to FIG. 12.

Figure 12:
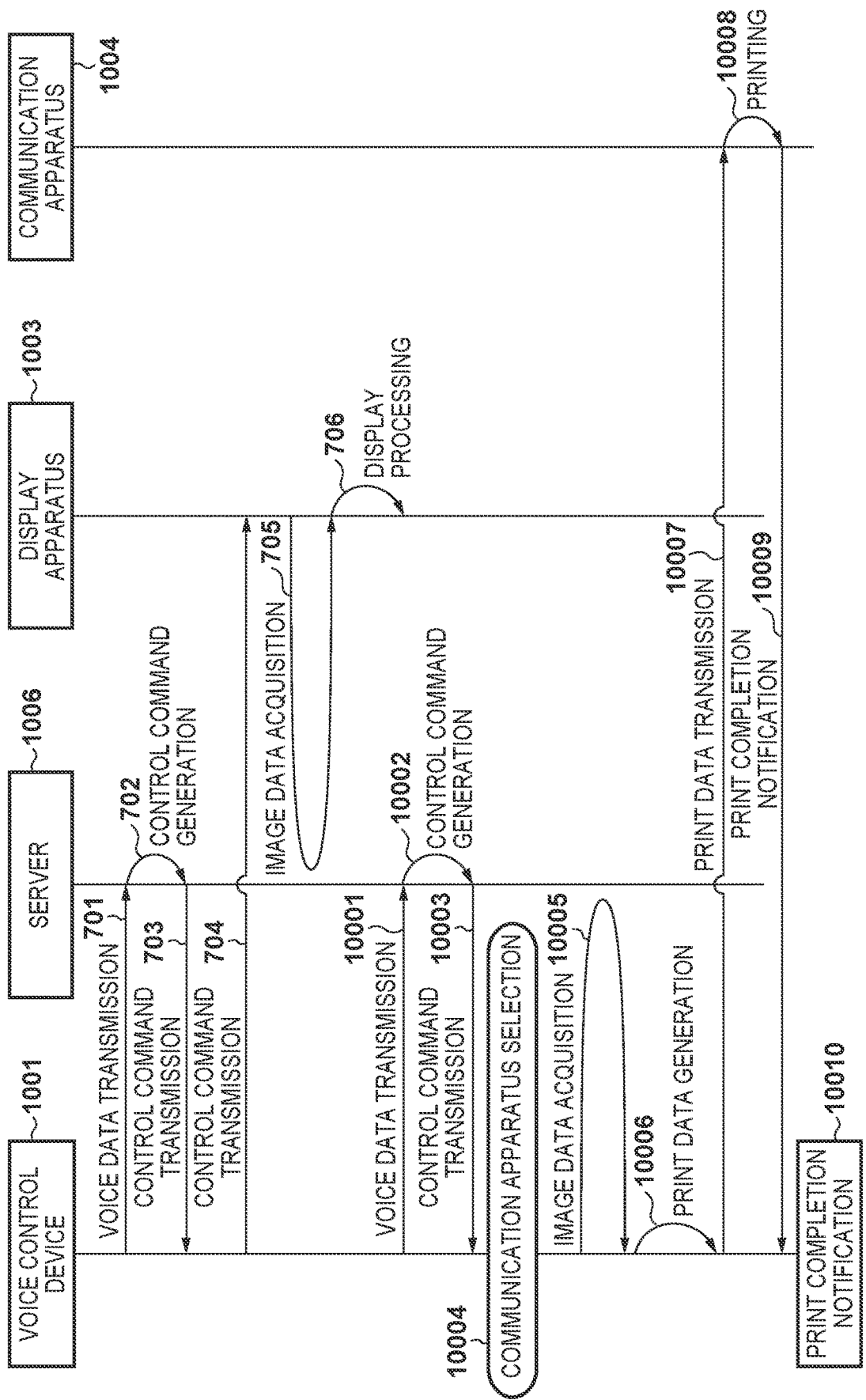
FIG. 12 is a sequence chart showing a sequence associated with print processing.

FIG. 12 is a sequence chart for explaining print processing. Note that the processes 701 to 706 are the same as in FIG. 7, and a detailed description thereof will be omitted. Additionally, in FIGS. 12 and 13, the voice control device 1001 generates print data. Hence, in this embodiment, the external storage device 107 of the voice control device 1001 stores print software that generates print data interpretable by the communication apparatus 1004, information necessary for communication, and the like.

The voice control device 1001 receives the voice of the wake word, thereby receiving the word uttered next. That is, the voice control device 1001 receives the voice "print the photo A displayed on the display apparatus 1003". The voice control device 1001 transmits the voice data to the server 1006 (process 10001).

The server 1006 analyses the voice data transmitted from the voice control device 1001 and executes processing based on the voice data. The server 1006 receives the voice data of the voice "print the photo A displayed on the display apparatus 1003". For this reason, the server 1006 generates a control command to print image data corresponding to the photo A (process 10002).

The server 1006 transmits the control command generated in the process 10002 to the voice control device 1001 (process 10003). The voice control device 1001 executes communication apparatus selection (process 10004). The voice control device 1001 executes processing according to the control command. Since the control command includes an instruction to acquire and print the image data corresponding to the photo A, the voice control device 1001 acquires the image data corresponding to the photo A from the server 1006 (process 10005).

The voice control device 1001 generates print data based on the acquired image data and print setting information (process 10006). The print setting information used in the process 10006 is set in advance in, for example, the print software held by the voice control device 1001. Alternatively, print setting information held by the server 1006 may be acquired and used.

The voice control device 1001 transmits the print data generated in the process 10006 to the communication apparatus 1004 (process 10007). When print processing based on the print data is completed (process 10008), the communication apparatus 1004 transmits a print completion notification to the voice control device 1001 (process 10009). Upon receiving the print completion notification, the voice control device 1001 notifies the print completion by voice (process 10010).

Figure 13:
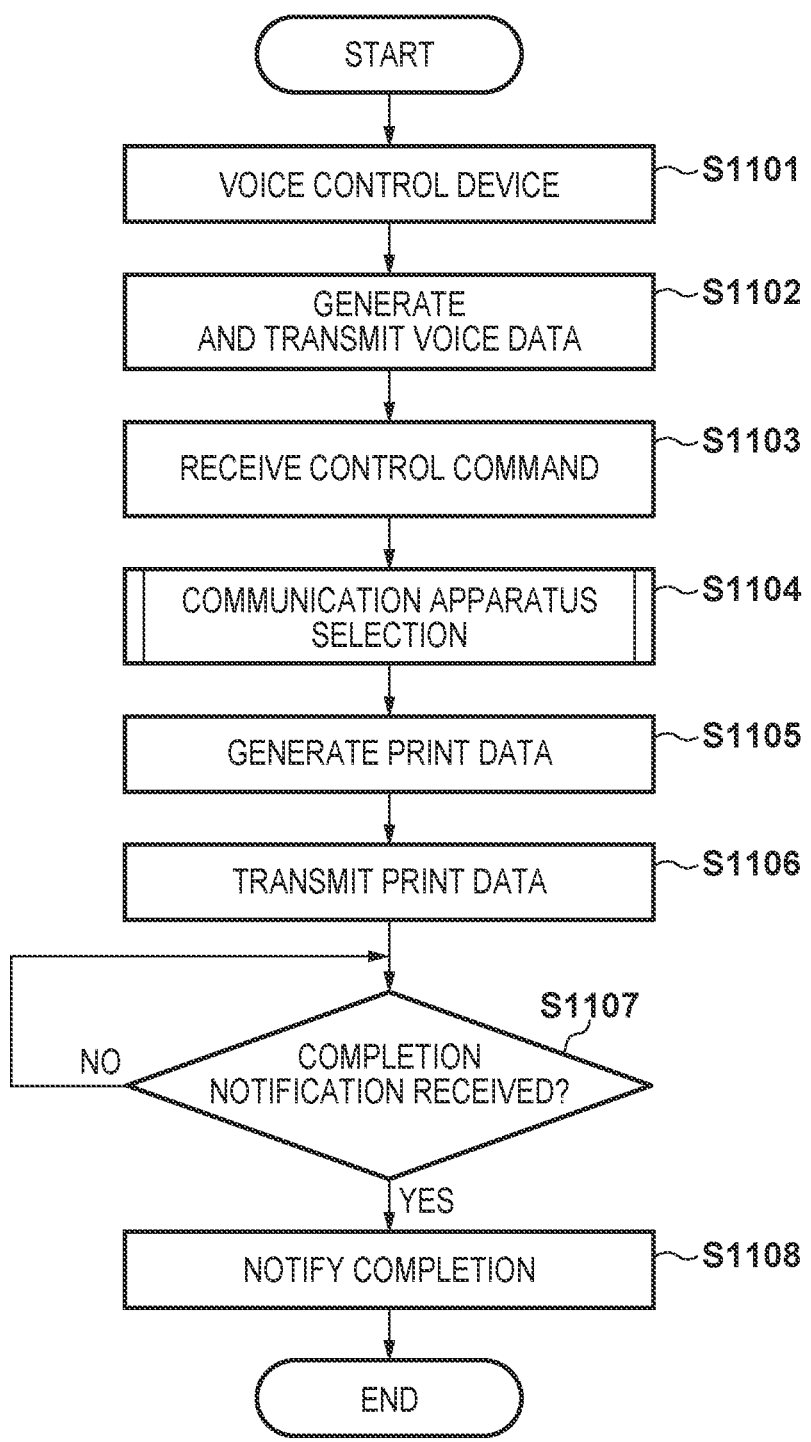
FIG. 13 is a flowchart showing the processing of the voice control device.

The processing of the voice control device 1001 will be described next with reference to FIG. 13. The flowchart of FIG. 13 corresponds to the processes 10001 to 10010 in FIG. 12. Note that steps S1101 and S1102 in FIG. 13 are the same as steps S901 and S902 in FIG. 9, and a detailed description thereof will be omitted.

The CPU 103 receives a control command from the server 1006 (step S1103). The CPU 103 analyses the received control command and specifies processing to be executed next. The control command includes an instruction to acquire the image data of the photo A and a print instruction of the image data. When the print instruction is received, the process advances to the procedure of selecting the communication apparatus 1004 (step S1104).

Figure 14:
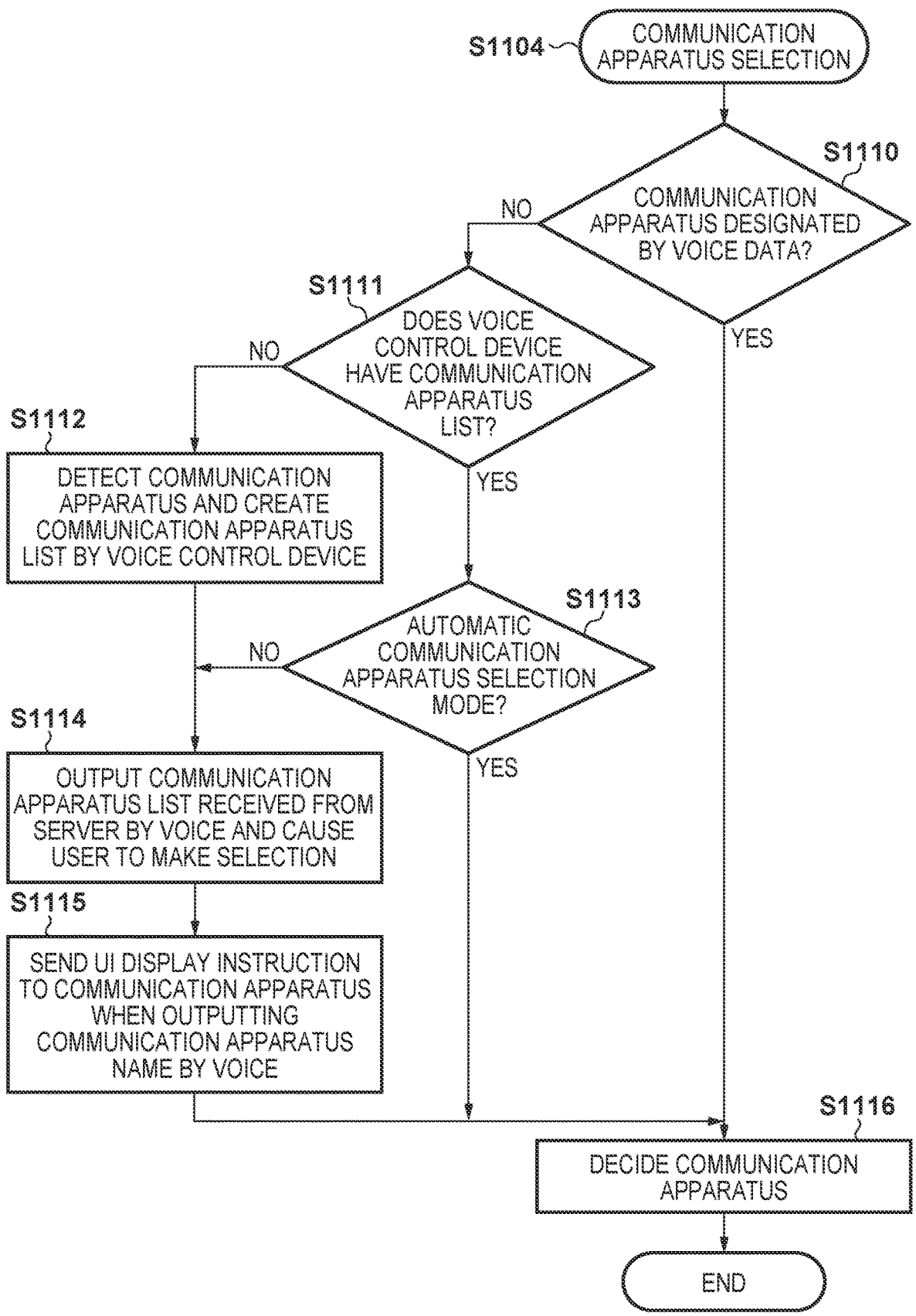
FIG. 14 is a flowchart showing the processing of the voice control device.

The sub-sequence of step S1104 starts from step S1109 in FIG. 14. In step S1110, it is determined whether the communication apparatus 1004 is designated by voice. Step S1110 is the same as step S914, and a description thereof will be omitted. In step S1111, it is determined whether the voice control device 1001 has a communication apparatus list. Step S1111 is the same as step S915, and a description thereof will be omitted.

Step S1112 is the same as step S917, and a description thereof will be omitted. Step S1113 is the same as step S926, and a description thereof will be omitted. Steps S1114, S1115, and S1116 are the same as steps S919, S920, and S921, and a description thereof will be omitted. The communication apparatus 1004 that should perform printing can be selected via the procedure shown in FIG. 14.

The CPU 103 acquires the image data from the server 1006 and generates print data (step S1105). Note that in step S1105, the print data is generated using print setting information set in advance in the voice control device 1001.

The CPU 103 transmits the print data to the communication apparatus (the communication apparatus 1004 in this embodiment) selected in step S1104 (step S1106). The CPU 103 determines whether the print completion notification is received (step S1107) and, upon receiving the print completion notification, notifies by voice that the printing is completed (step S1108). Note that step S1104 may be omitted if the communication apparatus 1004 is registered in accordance with an instruction input via the screen 507 shown in FIG. 5 described above as the device to be controlled by the voice control device 1001.

With the above-described processing, the user can print a desired photo using a desired communication apparatus by a simple operation. In addition, the load on the server 1006 can be reduced.

An example in which the display apparatus 1003 generates print data will be described next.

Figure 15:
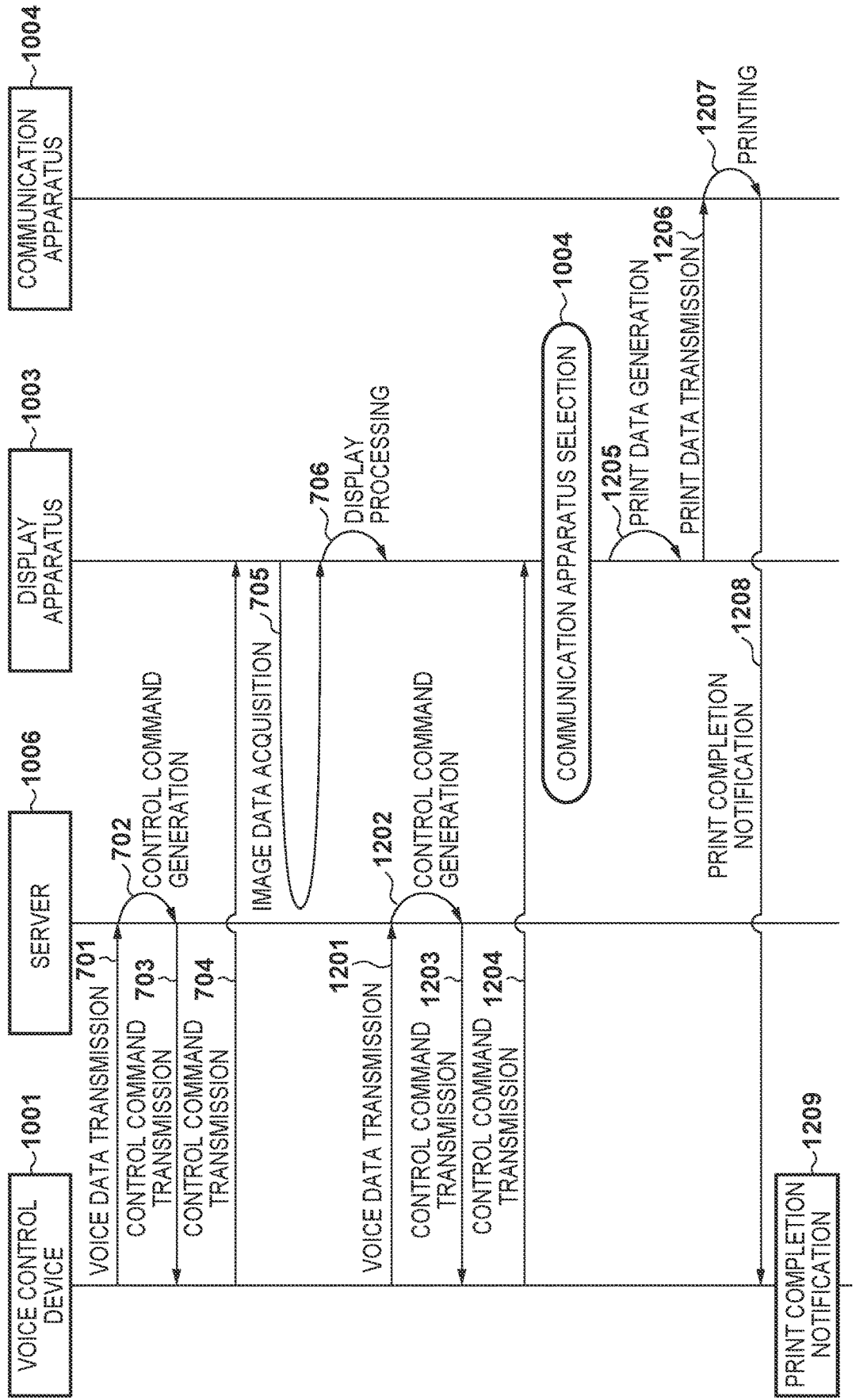
FIG. 15 is a sequence chart showing a sequence associated with print processing.

FIG. 15 is a sequence chart for explaining print processing. Note that the processes 701 to 706 are the same as in FIG. 7, and a detailed description thereof will be omitted. Additionally, processes 1201 to 1203 are the same as the processes 10001 to 10003 in FIG. 12, processes 1207 to 1209 are the same as the processes 10007 to 10009 in FIG. 12, and a detailed description thereof will be omitted. In the processing shown in FIG. 15, the display apparatus 1003 generates print data. Hence, the external storage device 207 of the display apparatus 1003 stores print software that generates print data interpretable by the communication apparatus 1004, information necessary for communication, and the like.

The voice control device 1001 executes processing according to the control command. Here, the control command includes an instruction to acquire and print image data corresponding to the photo A. In FIG. 15, the display apparatus 1003 generates print data. Hence, the voice control device 1001 transmits the control command to the display apparatus 1003 (process 1204).

The display apparatus 1003 executes processing according to the received control command. Since image data is already acquired for display the display apparatus 1003 generates print data based on the already acquired image data (process 1205). The print setting information used in the process 1205 is set in advance in the print software held by the display apparatus 1003. At this time, the display apparatus 1003 may display the print setting information on the display unit. The display apparatus 1003 transmits the print data generated in the process 1205 to the communication apparatus 1004 (process 1206). Note that in the transmission of the process 1206, the communication apparatus may be selected by the processing shown in FIG. 14.

With the above-described processing, the user can print a desired photo by a simple operation. In addition, the load on the server 1006 and the voice control device 1001 can be reduced.

Setup processing in which the communication apparatus 1004 executes print processing in accordance with a print instruction of voice input to the voice control device 1001 will be described next.

An example will be described concerning various types of voice control devices 1001. For example, when printing is performed using the voice control device 1001 of company A, server A corresponding to the voice control device 1001 generates print data. In addition, the communication apparatus 1004 can display a screen used to set a user ID and a password needed to access the server A.

When printing is performed using the voice control device 1001 of company B, server B corresponding to the voice control device 1001 generates print data. In addition, the communication apparatus 1004 prints an invitation page needed to access the server B. When printing is performed using the voice control device 1001 of company C, server C corresponding to the voice control device 1001 generates print data. In addition, an operation of the communication apparatus 1004 needed to access the server C is received by the portable terminal 1002.

When printing is performed using the voice control device 1001 of company D, the voice control device 1001 generates print data. That is, server cooperation is unnecessary. When printing is performed using the voice control device 1001 of company E, server E corresponding to the voice control device 1001 generates print data. In addition, the communication apparatus 1004 can display a screen used to set a user ID and a password needed to access the server E. Note that the communication apparatus 1004 holds a table shown in FIG. 18 in which the above-described features are put together. Note that the wake word changes depending on the maker of the voice control device 1001.

Figure 16:
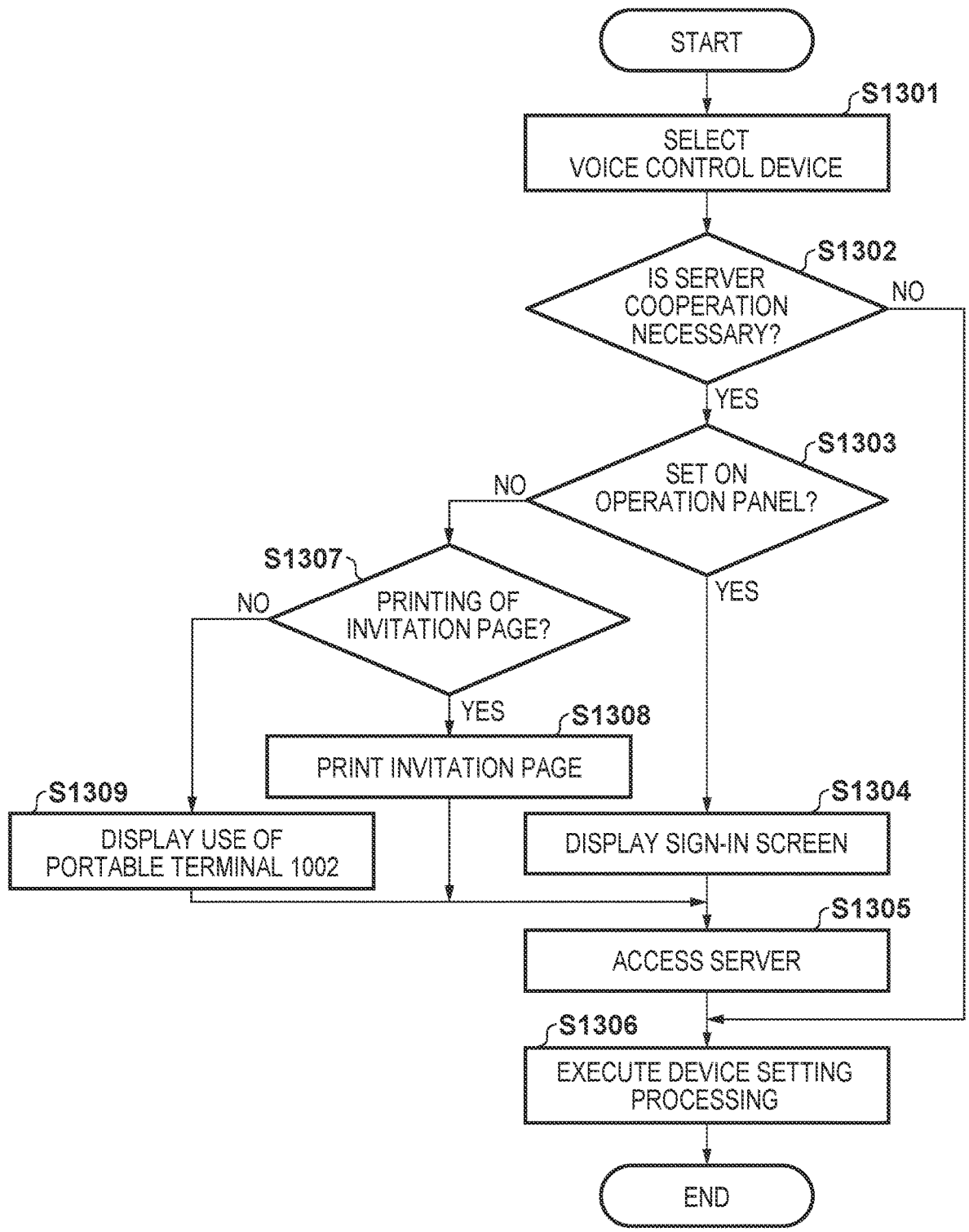
FIG. 16 is a flowchart showing the processing of the communication apparatus.
Figure 17:
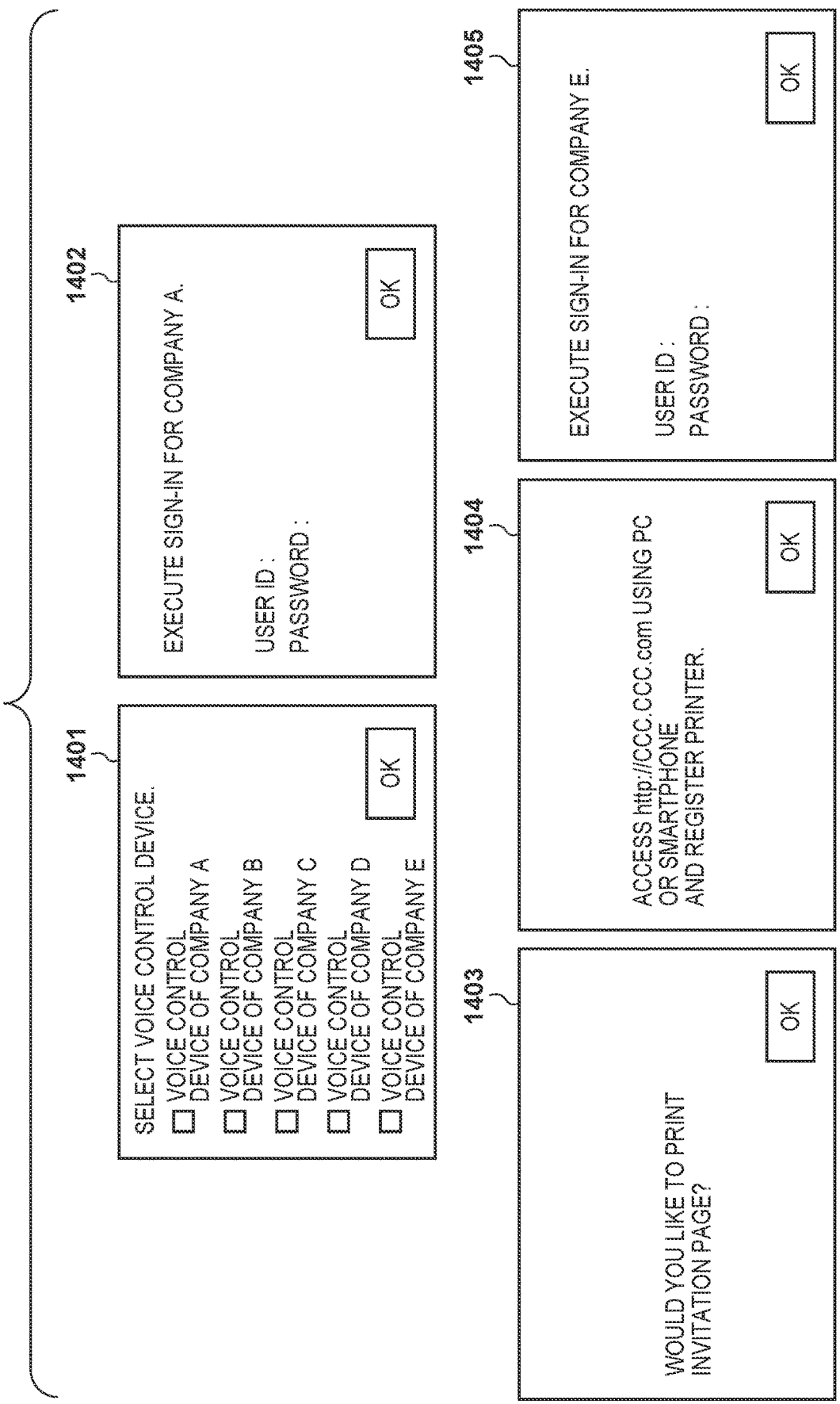
FIG. 17 is a view showing screens displayed by the communication apparatus.

The processing of the communication apparatus 1004 will be described next with reference to FIG. 16. First, when the user instructs cooperation between the voice control device 1001 and the communication apparatus 1004, the CPU 407 displays a selection screen 1401 of the voice control device 1001 as the cooperation target (step S1301). Note that FIG. 17 shows an example of screens associated with the setup of the communication apparatus 1004.

The CPU 407 determines, based on the voice control device 1001 selected on the selection screen 1401, whether server cooperation is necessary (step S1302). For example, the communication apparatus 1004 performs the determination in step S1302 using the table shown in FIG. 18. That is, if the voice control device 1001 of one of companies A to C is selected, the CPU 407 determines Yes in step S1302. On the other hand, if the voice control device 1001 of company D is selected, the CPU 407 determines No. Upon determining No in step S1302, the process of the CPU 407 advances to step S1306 to be described later.

Upon determining Yes in step S1302, the CPU 407 determines whether to execute sign-in on the operation panel of the communication apparatus 1004 (step S1303). If the voice control device 1001 of company A or E is selected, the CPU 407 determines Yes in step S1303. On the other hand, if the voice control device 1001 of one of companies B and C is selected, the CPU 407 determines No in step S1303.

Upon determining Yes in step S1303, the CPU 407 displays a sign-in screen on the operation panel (step S1304) and accesses the server 1006 using a user ID and a password input in the sign-in screen (step S1305). At this time, if the voice control device 1001 of company A is selected, a sign-in screen 1402 is displayed in step S1304. On the other hand, if the voice control device 1001 of company E is selected, a sign-in screen 1405 is displayed in step S1304.

On the other hand, upon determining No in step S1303, the CPU 407 determines whether to print the invitation page (step S1307). If the voice control device 1001 of company B is selected, the CPU 407 determines Yes in step S1307. On the other hand, if the voice control device 1001 of company C is selected, the CPU 407 determines No in step S1307.

Upon determining Yes in step S1307, the CPU 407 displays a screen 1403 representing that the invitation page is to be printed. When the OK button on the screen 1403 is pressed, the CPU 407 prints the invitation page (step S1308). In this case, the CPU 407 transmits the print request of the invitation page and the Mac address of the communication apparatus 1004 to the server B and receives the print data of the invitation page from the server B. The CPU 407 then executes print processing based on the received print data.

Note that the printed invitation page includes a printed dedicated URL associated with registration processing of the communication apparatus 1004. Hence, when the user inputs the URL in the invitation page to the portable terminal 1002 or the like, a sign-in screen for the communication apparatus 1004 is displayed on the portable terminal 1002. The user inputs a user ID and a password to the sign-in screen for the communication apparatus 1004 displayed on the portable terminal 1002 and transmits them to the server B. The server B executes sign-in processing based on the user ID and the password received from the sign-in screen for the communication apparatus 1004. When the processing succeeds, the server B manages the user ID received from the sign-in screen for the communication apparatus 1004 and the Mac address of the communication apparatus 1004 in association with each other. The server B notifies the communication apparatus 1004 that the sign-in has succeeded, and transmits the user ID and the password to the communication apparatus 1004. With the above-described processing, the CPU 407 accesses the server B in step S1305 after the process of step S1308 (step S1305).

Upon determining No in step S1307, the CPU 407 displays a message 1404 representing association is performed using the portable terminal 1002 (step S1309). That is, if the voice control device 1001 of company C is selected, step S1309 is executed. Note that the process of step S1309 corresponds to another process in the processing of causing the above-described communication apparatus 1004 to sign in to the server 1006, and a detailed description thereof will be omitted. With the above-described processing, the CPU 407 accesses the server C in step S1305 after the process of step S1309 (step S1305). After that, the CPU 407 executes setting processing for cooperation with the voice control device 1001 after step S1305 (step S1306).

Setting processing for the cooperation of the communication apparatus 1004 with the voice control device 1001 will be described. For example, in a case in which print data is not received for a predetermined period, the communication apparatus 1004 operates in a power saving state. There are a plurality of types of power saving states. For example, there is a first power saving mode in which print processing based on print data is executed when the communication apparatus 1004 receives the print data during an operation in the power saving state. In addition, there is a second power saving mode in which print data is not printed even when the print data is received. The power consumption in the second power saving mode is smaller than that in the first power saving mode. Here, the CPU 407 sets the first power saving mode as the setting processing for cooperation with the voice control device 1001. Note that in the first power saving mode, print processing may be executed only when print data based on a print instruction by voice received by the voice control device 1001 is received.

As the process of step S1301, an example in which the user selects the voice control device 1001 has been described. However, another method may be used. For example, the communication apparatus 1004 acquires device information from the voice control device 1001 found by executing the device search. The CPU 407 may automatically select the voice control device 1001 as the cooperation target based on the device information acquired from the voice control device 1001. In this case, the process of step S1301 is omitted.

With the above-described processing, even when print data is transmitted via various routes, the communication apparatus 1004 can appropriately execute print processing. Note that when executing the processing shown in FIG. 16, in a case in which a plurality of identical voice control devices 1001 exist on the network, the communication apparatus 1004 signs in to the same server 1006 to cooperate with the voice control devices 1001. For example, when a plurality of voice control devices 1001 of the company A exist on the network, the user need only perform sign-in once using the communication apparatus 1004 to cooperate with the server A. On the other hand, when a plurality of different voice control devices 1001 exist on the network, the communication apparatus 1004 signs in to different servers to cooperate with the voice control devices 1001. For example, when the voice control device 1001 of the company A and the voice control device 1001 of the company E exist on the network, the user performs sign-in using the communication apparatus 1004 to cooperate with the server A and performs sign-in to cooperate with the server E.

Figure 19:
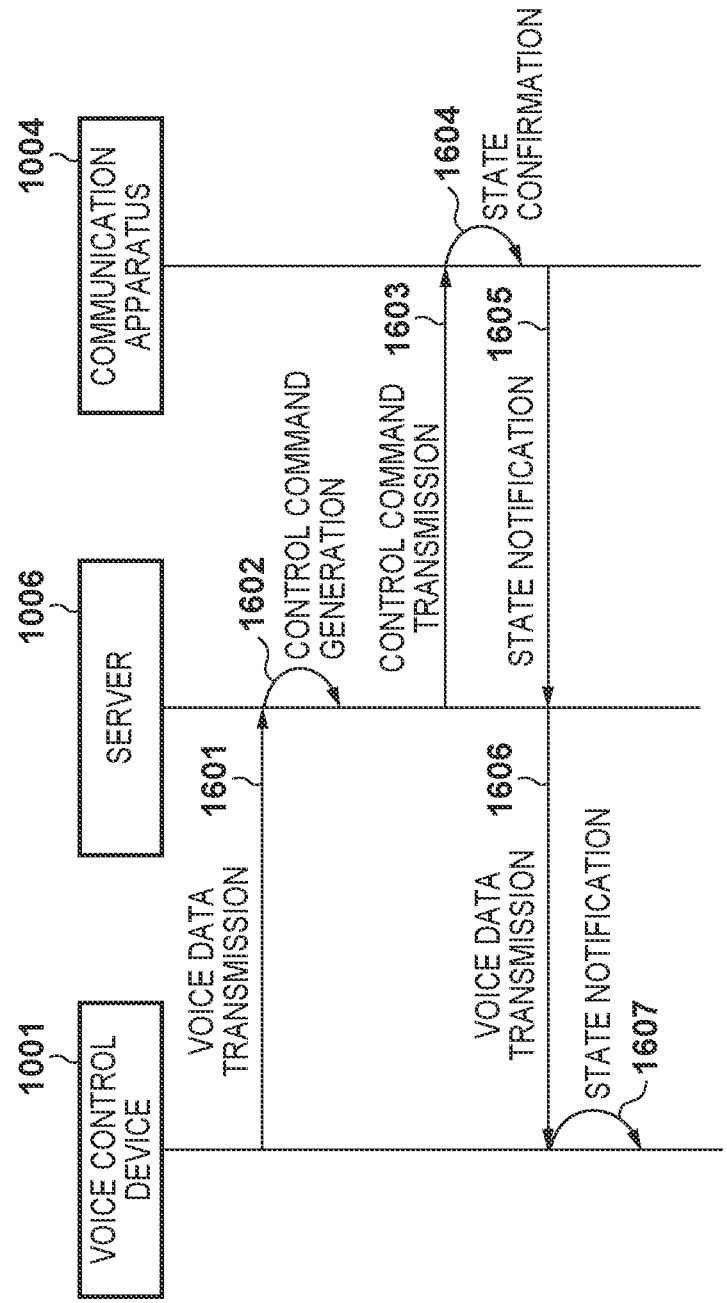
FIG. 19 is a sequence chart showing a sequence associated with processing different from printing.

Processing performed in a case in which the user requests processing other than print processing by voice will be described next with reference to FIG. 19. For example, the user utters the wake word and then utters "tell me the remaining amount of ink".

The voice control device 1001 receives the voice of the wake word, thereby receiving the voice uttered next. That is, the voice control device 1001 receives the voice "tell me the remaining amount of ink".

The voice control device 1001 transmits the identification information (for example, the Mac address) of the voice control device 1001 and voice data based on the received voice to the server 1006 (process 1601).

The server 1006 analyzes the voice data transmitted from the voice control device 1001, generates a control command based on the voice data (process 1602), and transmits the control command to the communication apparatus 1004 (process 1603). The control command includes an ink remaining amount confirmation instruction.

The communication apparatus 1004 executes processing according to the control command. Here, the communication apparatus 1004 confirms the remaining amount of ink (process 1604) and transmits the confirmation result to the server 1006 (process 1605). The server 1006 generates voice data based on the confirmation result. For example, when a confirmation result representing that cyan ink is short is received, the server 1006 generates voice data representing that cyan ink is short.

The voice control device 1001 notifies the confirmation result by voice based on the received voice data (process 1607). Note that a query about the state of the communication apparatus, the remaining amount of paper, or the like may be received in addition to the remaining amount of ink.

In addition, if the user receives a voice notification representing that cyan ink is short, he/she may order the cyan ink by voice. In this case, the voice control device 1001 receives the serial number for specifying the product type of the communication apparatus 1004. Then, the voice control device 1001 transmits the serial number and the voice data representing the order of the cyan ink to the server 1006. Then, the server 1006 may generate order data based on the voice data and the serial number and transmit it to a dedicated server or the like to perform order processing.

In addition, when an error or the like occurs, and a work by the user is necessary, the communication apparatus 1004 displays the work method on the operation panel of the communication apparatus 1004. At this time, as for a work that needs both hands as the work of the user, voice data of the work method is generated and transmitted to the voice control device 1001. Then, the voice control device 1001 notifies the work method by voice. Accordingly, even the work for which the user uses both hands can easily be performed. For example, an ink exchange method may be displayed on the operation panel by the communication apparatus 1004, and paper jam that occurs during printing or ink wiping cleaning may be notified by voice.

With the above-described processing, the user can easily request an instruction other than printing.

Figure 20:
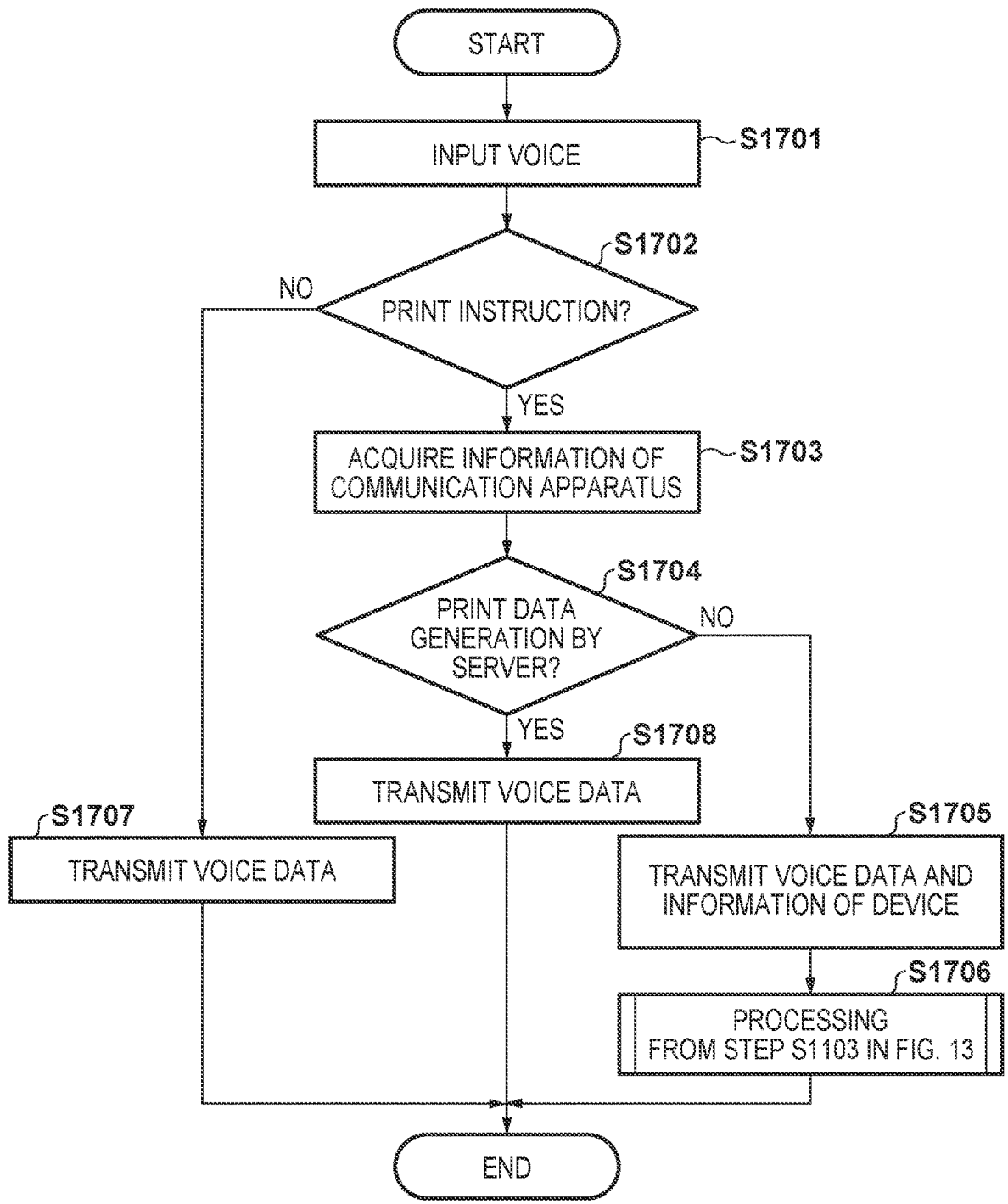
FIG. 20 is a flowchart showing the processing of the voice control device.

Processing of switching, by the voice control device 1001, whether to generate print data by itself or request the server 1006 to generate print data will be described next. FIG. 20 is a flowchart for explaining the processing of the voice control device 1001.

The CPU 103 inputs words (voice) uttered by the user on the periphery of the voice control device 1001 (step S1701). The CPU 103 determines whether a print instruction is included in the voice (step S1702). Upon determining No in step S1702, the CPU 103 generates voice data based on the input voice and transmits it to the server 1006 (step S1707).

On the other hand, upon determining Yes in step S1702, the CPU 103 acquires the information of the communication apparatus 1004 (step S1703). For example, in a case in which the communication apparatus 1004 has performed sign-in processing for the server 1006, the communication apparatus 1004 holds information representing that server cooperation is performed. For this reason, in step S1703, the information representing that server cooperation is performed or information representing that the sign-in processing for the server 1006 is completed is acquired.

The CPU 103 determines, based on the information acquired in step S1703, whether the server 1006 generates print data (step S1704). More specifically, when the information representing that server cooperation is performed or the information representing that the sign-in processing for the server is completed is acquired in step S1703, the CPU 103 determines that the server 1006 generates print data. On the other hand, if these pieces of information are not acquired in step S1703, the CPU 103 determines that the server 1006 does not generate print data.

Upon determining No in step S1704, the CPU 103 generates voice data based on the input voice. In addition, the CPU 103 generates information that designates the "voice control device 1001" as the device for generating print data. Then, the CPU 103 transmits the voice data and the information that designates the device for generating print data to the server 1006 (step S1705).

In step S1706, the CPU 103 executes the processes of steps S1103 to S1107 shown in FIG. 13 (step S1706). As a result, processing from step S1103 shown in FIG. 13 is executed. On the other hand, upon determining Yes in step S1704, the CPU 103 generates voice data based on the input voice and transmits it to the server 1006 (step S1708). After step S1708, processing from the process 708 shown in FIG. 7 is executed. Note that in step S1708, information that designates the "server 1006" as the device for generating print data may be transmitted together with the voice data.

With the above-described processing, when the communication apparatus 1004 can acquire print data from the server 1006, the voice control device 1001 causes the server 1006 to generate print data. On the other hand, when the communication apparatus 1004 cannot acquire print data from the server 1006, the voice control device 1001 generate print data. With the above-described processing, the voice control device 1001 can execute efficient processing. More specifically, when the communication apparatus 1004 can acquire print data from the server 1006, the voice control device 1001 can request the server 1006 to generate print data, and therefore, the print data generation load is reduced.

Note that in FIG. 20, the processing from step S1702 is executed when the user inputs a voice in step S1701. However, the timing may be another timing. For example, the device for generating print data may be determined in advance by executing steps S1703 and S1704 by the voice control device 1001 before step S1701.

Additionally, in step S1704, another information may be acquired. For example, since the communication apparatus 1004 can recognize whether it has already signed in to the server 1006, the communication apparatus 1004 may designate the "voice control device 1001" or the "server 1006" as the device for generating print data. Alternatively, information representing whether server cooperation is enabled or not may be acquired in step S1703. If server cooperation is enabled, Yes may be determined in step S1704. If server cooperation is disabled, No may be determined in step S1704.

In the above-described embodiment, a form in which a photo displayed on the display apparatus 1003 is printed has been described. However, printing may be instructed in another form. For example, the user utters "print a file A" next to the wake word. The voice control device 1001 transmits voice data corresponding to the voice "print a file A" to the server 1006. Then, the server 1006 may search data managed for the user for data with a name "file A" and generate print data.

Additionally, in the above-described embodiment, a case in which image data corresponding to the photo is printed has been described. However, the data of the print target is not limited to image data and may be document data.

Furthermore, in the above-described embodiment, a form in which the communication apparatus 1004 performs printing in accordance with the print instruction of the voice uttered by the user has been described. However, the communication apparatus 1004 may execute print processing based on print data generated by an instruction other than a voice for print software (for example, a printer driver) installed in the personal computer. Note that the instruction other than a voice is an instruction input by an operation using a pointing device or an operation using a touch panel.

Additionally, in the above-described embodiment, Bluetooth has been described as an example of short-distance wireless communication. However, another communication method may be used. For example, WiFiAware may be used in place of Bluetooth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223056, filed Nov. 20, 2017, which is hereby incorporated by reference herein in its entirety.

What is claimed is:

1. A control system including a server system and a printing apparatus,
the server system comprising:
one or more processors; and
one or more memories storing instructions that, when executed by the one or more processors, cause the server system to:
cause a voice control device to notify a candidate of the printing apparatus;
in a case in which the voice control device receives a designation of the printing apparatus from the candidate of the printing apparatus by voice based on the candidate of the printing apparatus which has been notified, cause the printing apparatus corresponding to the designation to execute printing;
determine whether the printing apparatus corresponding to the designation can execute the printing; and
in a case in which it is determined that the printing apparatus cannot execute the printing, cause the voice control device to notify by voice that the printing apparatus cannot execute the printing, and
wherein the printing apparatus executes the printing based on control of the server system.

2. The system according to claim 1, wherein the voice control device notifies the candidate of the printing apparatus by voice.

3. The system according to claim 1, wherein the one or more memories stores instructions that, when executed by the one or more processors, further cause the server system to acquire the candidate of the printing apparatus, and
wherein the acquired candidate of the printing apparatus is notified.

4. The system according to claim 3, wherein the candidate of the printing apparatus is acquired by receiving a response to a device search.

5. The system according to claim 3, wherein the candidate of the printing apparatus is acquired based on a set value used to execute the printing.

6. The system according to claim 3, wherein the one or more memories stores instructions that, when executed by the one or more processors, further cause the server system to determine whether a voice instruction received by the voice control device includes a designation of the printing apparatus to execute the printing, and
wherein if it is determined that the designation of the printing apparatus to execute the printing is not included, the candidate of the printing apparatus is acquired.

7. The system according to claim 6, wherein if it is determined that the designation of the printing apparatus to execute the printing is included, the printing apparatus corresponding to the designation is caused to execute the printing based on the voice instruction.

8. The system according to claim 1, wherein it is determined whether the printing apparatus can execute the printing based on whether the printing apparatus corresponding to the designation is in a state in which the printing can be executed.

9. A control method of a voice control system including a server system and a printing apparatus, the control method, executed by at least one processor in the server system, comprising:
causing a voice control device to notify a candidate of the printing apparatus;
causing, in a case in which the voice control device receives a designation of the printing apparatus from the candidate of the printing apparatus by voice based on the candidate of the printing apparatus which has been notified, the printing apparatus corresponding to the received designation to execute the printing;
determining whether the printing apparatus corresponding to the designation can execute the printing; and
causing, in a case in which it is determined that the printing apparatus cannot execute the printing, the voice control device to notify by voice that the printing apparatus cannot execute the printing.

10. The method according to claim 9, wherein the voice control device notifies the candidate of the printing apparatus by voice.

11. The method according to claim 9, further comprising acquiring the candidate of the printing apparatus, wherein the acquired candidate of the printing apparatus is notified.

12. The method according to claim 11, wherein the candidate of the printing apparatus is acquired by receiving a response to a device search.

13. The method according to claim 11, wherein the candidate of the printing apparatus is acquired based on a set value used to execute the printing.

14. The method according to claim 11, further comprising determining whether a voice instruction received by the voice control device includes a designation of the printing apparatus to execute the printing, wherein if it is determined that the designation of the printing apparatus to execute the printing is not included, the candidate of the printing apparatus is acquired.

15. The method according to claim 14, wherein if it is determined that the designation of the printing apparatus to execute the printing is included, the printing apparatus corresponding to the designation is caused to execute the printing based on the voice instruction.

16. The method according to claim 9, wherein it is determined whether the printing apparatus can execute the printing based on whether the printing apparatus corresponding to the received designation is in a state in which the printing can be executed.

17. A non-transitory computer-readable storage medium storing a program configured to cause a computer to operate a method of a control system including a server system and a printing apparatus, the method, executed by at least one processor in the server system, comprising:

causing a voice control device to notify a candidate of the printing apparatus;

causing, in a case in which the voice control device receives a designation of the printing apparatus from the candidate of the printing apparatus by voice based on the candidate of the printing apparatus which has been notified, the printing apparatus corresponding to the received designation to execute the printing;

determining whether the printing apparatus corresponding to the designation can execute the printing; and causing, in a case in which it is determined that the printing apparatus cannot execute the printing, the voice control device to notify by voice that the printing apparatus cannot execute the printing.

* * * * *